(12) United States Patent
Kurniawati et al.

(10) Patent No.: US 8,812,423 B1
(45) Date of Patent: Aug. 19, 2014

(54) OBJECT QUALIFIERS FOR MULTI-DIMENSIONAL OBJECT MODEL

(75) Inventors: Ruth Kurniawati, Nashua, NH (US);
Mark Parenti, Milford, NH (US);
Stephen Todd, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 454 days.

(21) Appl. No.: 12/803,497

(22) Filed: Jun. 29, 2010

(51) Int. Cl.
*G06F 21/00* (2013.01)

(52) U.S. Cl.
USPC .......................................................... 706/47

(58) Field of Classification Search
USPC .......................................................... 706/47
See application file for complete search history.

(56) References Cited

U.S. PATENT DOCUMENTS

| | | | |
|---|---|---|---|
| 6,781,607 B1 * | 8/2004 | Benham ........................ | 715/744 |
| 7,523,231 B1 | 4/2009 | Gupta et al. | |
| 2006/0253314 A1 * | 11/2006 | Reznichenko et al. ........... | 705/9 |
| 2009/0157580 A1 * | 6/2009 | Abnous et al. .................. | 706/45 |

OTHER PUBLICATIONS

U.S. Appl. No. 12/798,234, filed Mar. 31, 2010, Wood et al.
U.S. Appl. No. 11/906,131, filed Sep. 28, 2007, Gupta et al.

* cited by examiner

*Primary Examiner* — Kakali Chaki
*Assistant Examiner* — Michael Zidanic
(74) *Attorney, Agent, or Firm* — Muirhead and Saturnelli, LLC

(57) ABSTRACT

Described are techniques for providing views of an object model. A template is received that specifies allowable access for a first object using qualifiers for the first object. The qualifiers include a first list of one or more roles and a second list of one or more levels of expertise. For a user identifier having an associated role and an associated level of expertise, it is determined whether to allow access to the first object. The determining includes determining whether the associated role is included in the first list and whether the associated level of expertise is included in the second list. Access to the first object is allowed if the associated role is included in the first list and the associated level of expertise is included in the second list.

19 Claims, 23 Drawing Sheets

```
1102    [QUALIFIERS]
1104    CLASS name1
        {
1106        [QUALIFIERS]
1108        Attribute_type ATT1
            ..
1110        [QUALIFIERS]
1112        Attribute_type ATTN
            ..
1114        [QUALIFIERS]
1116        Method1 (parameter(s))
            ..
1118        [QUALIFIERS]
1120        CLASS name2 Object2
        };
```

```
1302    [EMC_Roles{"administrator(Write)", "manager", "monitor"},
1304    EMC_UserLevel{"Expert"}]
1306    class ExchangeApplication : EMC_ExchangeApplication
        {
1308        [Description("The overall Exchange Application Size"),
1310        EMC_UserLevel{"Novice", "Generalist"}]
1312        uint64 Size;

1314        [Key, Description("Application id"),
1316        EMC_UserLevel{"Novice", "Generalist"}]
1318        string ID;

1320        [Write, Description("Number of mailboxes"),
1322        EMC_UserLevel{"Generalist"}]
1324        uint64 NumberOfMailboxes;

1326        [Write, Description("Size of mailbox"),
1328        EMC_UserLevel{"Generalist"}]
1330        uint64 SizeOfMailbox;

1332        [Write, Description("Number of high users")]
1334        uint64 NumberOfHighUsers;

1336        [Write, Description("Number of medium users")]
1338        uint64 NumberOfMidUsers;

1340        [Write, Description("Number of low users")]
1342        uint64 NumberOfLowUsers;

1344        [Write, Description("Exchange application description"),
1346        EMC_UserLevel{"Novice", "Generalist"}]
1348        string Description;

1350        [Write, Description("Exchange application name"),
1352        EMC_UserLevel{"Novice", "Generalist"}]
1354        string ElementName;

1356        [Description("Installation date")]
1358        DateTime InstallDate;

1360        uint16 OperationalStatus[];
        };
```

FIGURE 14

```
1502    [EMC_Roles{"administrator", "manager"},
1504    EMC_UserLevel{"Expert", "Generalist"}]
1506    class StorageGroup : EMC_ExchangeStorageGroup
        {
1508      [Description("The size of a Storage Group")]
1510      uint64 Size;

1512      [Description("Element name"), Key]
1514      string DeviceID;

1516      [Description("Element name"), Write]
1518      string ElementName;

1520      [Description("Description"), Write ]
1522      string Description;

1524      [Description("Install Date")]
1526      DateTime InstallDate;

1528      [Description("Date the Storage Group was last modified")]
1530      DateTime LastModifyDate;
        };
```

FIGURE 16

```
1702    [EMC_Roles{"administrator", "monitor" "manager"},
1704    EMC_UserLevel{"Generalist", "expert"},
        ]
1706    class Component : EMC_Component
        {
1712        ExchangeApplication REF GroupComponent;
1714        StorageGroup REF PartComponent;
        }
```

OBJECT QUALIFIERS FOR MULTI-DIMENSIONAL OBJECT MODEL

BACKGROUND

1. Technical Field

This application generally relates to object models, and more particularly to techniques used in connection with management of multi-dimensional object models.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Data may be stored on a data storage system in accordance with any one or more different data models. The data storage system may store data, for example, as objects and the data may be used by multiple applications and/or hosts. Individuals may need to access different portions of the data and there is a need to restrict or control an individual's access to appropriate portions of the data. It may be desirable to utilize a flexible technique to control such access and provide a sufficient granularity of control such as may be needed in complex data storage systems and/or complex data storage system environments.

SUMMARY OF THE INVENTION

In accordance with one aspect of the invention is a computer-implemented method for providing views of an object model. A template is received specifying allowable access for a first object using qualifiers for the first object. The qualifiers include a first list of one or more roles and a second list of one or more levels of expertise. It is determined, for a user identifier having an associated role and an associated level of expertise, whether to allow access to the first object. The determining includes determining whether the associated role is included in the first list and whether the associated level of expertise is included in the second list. Access to the first object is allowed if the associated role is included in the first list and the associated level of expertise is included in the second list. The first object may include one or more members. The template may include a description for each of the one or more members and may indicate that each of the one or more members is included in the first object. At least one of the members of the first object may be an attribute. At least one of the members of the first object may be a first method corresponding to an operation performed in connection with the first object. At least one of the members of the first object may be a second object. The qualifiers for the first object may be first qualifiers and the template may specify second qualifiers for a first of the members of the first object. The second qualifiers may include a third list of one or more roles and a fourth list of one or more levels of expertise. The method may include determining, for the user identifier having the associated role and the associated level of expertise, whether to allow access to said first member, said determining whether to allow access to the first member including determining whether said associated role is included in said first list, whether said associated role is included in said third list, whether said associated level of expertise is included in said second list, and whether said associated level of expertise is included in said fourth list; and allowing access to said first member if said associated role is included in at least one of the first list and the third list, and if said associated level of expertise is included in at least one of the second list and the fourth list. The first qualifiers of the first object may be applied to each of the members of the first object when determining whether to allow access to said each member. When determining whether to allow access to said first member, the first qualifiers may be evaluated in combination with said second qualifiers. The qualifiers for the first object may be first qualifiers. The template may specify second qualifiers for the first method. The second qualifiers may include a third list of one or more roles and a fourth list of one or more levels of expertise. The first method may include one or more parameters and the template may specify parameter-level qualifiers for at least one a first of said one or more parameters. The method may also include performing first processing to determine whether a first value provided as said first parameter by a user having the user identifier is allowable, said first processing including evaluating, in combination, said first qualifiers, said second qualifiers and said parameter-level qualifiers. The qualifiers of said first object may be first qualifiers, and the template may specify allowable access for a second object using second qualifiers for the second object. The second qualifiers may include a third list of one or more roles and a fourth list of one or more levels of expertise. The template may specify an association between said first object and said second object and third qualifiers for the association specifying allowable access for the association. Each of the one or more levels of expertise may indicate a different level of knowledge. The method may include determining, using said template, information displayed on a user interface in accordance with said user identifier, wherein said information displayed varies with which of a plurality of roles and which of a plurality of levels of expertise are associated with said user identifier. The first object may be an instance of a first class and the qualifiers for the first object may be specified using at least one of a class level qualifier for a class definition of the first class and an object level qualifier applicable to one or more objects of said first class identified in said template. The first object may be one of said one or more objects. The class level qualifier may be applicable to all objects of the first class. The one or more levels of expertise may include a first level indicating a first user knowledge level and a second level indicating a second user knowledge level greater than said first level. When the user identifier is associated with said first level, a user using said user identifier may have access to said first object and may not have access to said association and may not have access to said second object. When the user identifier is associated with said second level, a user using said user identifier may have access to said first object, said second object, and said association. When the user identifier is associated with said first level, a user using said user identifier may not have access to all members of said first object. When the user identifier is associated with said second level, a user using said user identifier may have access to all members of said first object. The template may identify allowable operations that can be performed for data storage administration. The first object and the second object may be included in a plurality of objects described by said template. The first object may represent an application. The second object may represent a data storage area used by said application for storing data. The second object may have at least a first method thereof identifying an administrative task performed for the data storage area. The template may indicate, using said second qualifiers and using other qualifiers included in the template for the first method, that the user identifier has access to the first method and is allowed to perform the administrative task for the data storage area. The first list of one or more roles may specify one or more data storage administrative roles and the second list of one or more levels of expertise may specify one or more knowledge levels of data storage administration.

In accordance with another aspect of the invention is a computer readable medium comprising code stored thereon for providing views of an object model, the computer readable medium comprising code stored thereon that, when executed, performs steps comprising: receiving a template specifying allowable access for a first object using qualifiers for the first object, said qualifiers including a first list of one or more roles and a second list of one or more levels of expertise; determining, for a user identifier having an associated role and an associated level of expertise, whether to allow access to said first object, said determining including determining whether said associated role is included in said first list and whether said associated level of expertise is included in said second list; and allowing access to said first object if said associated role is included in the first list and said associated level of expertise is included in the second list.

BRIEF DESCRIPTION OF THE DRAWINGS

Features and advantages of the present invention will become more apparent from the following detailed description of exemplary embodiments thereof taken in conjunction with the accompanying drawings in which:

FIGS. 11 and 12 are examples illustrating how qualifiers may be specified in a template in accordance with techniques herein;

FIGS. 14, 16 and 18 are examples of portions of a template that may be used in an embodiment in accordance with techniques herein;

DETAILED DESCRIPTION OF EMBODIMENT(S)

Figure 1:
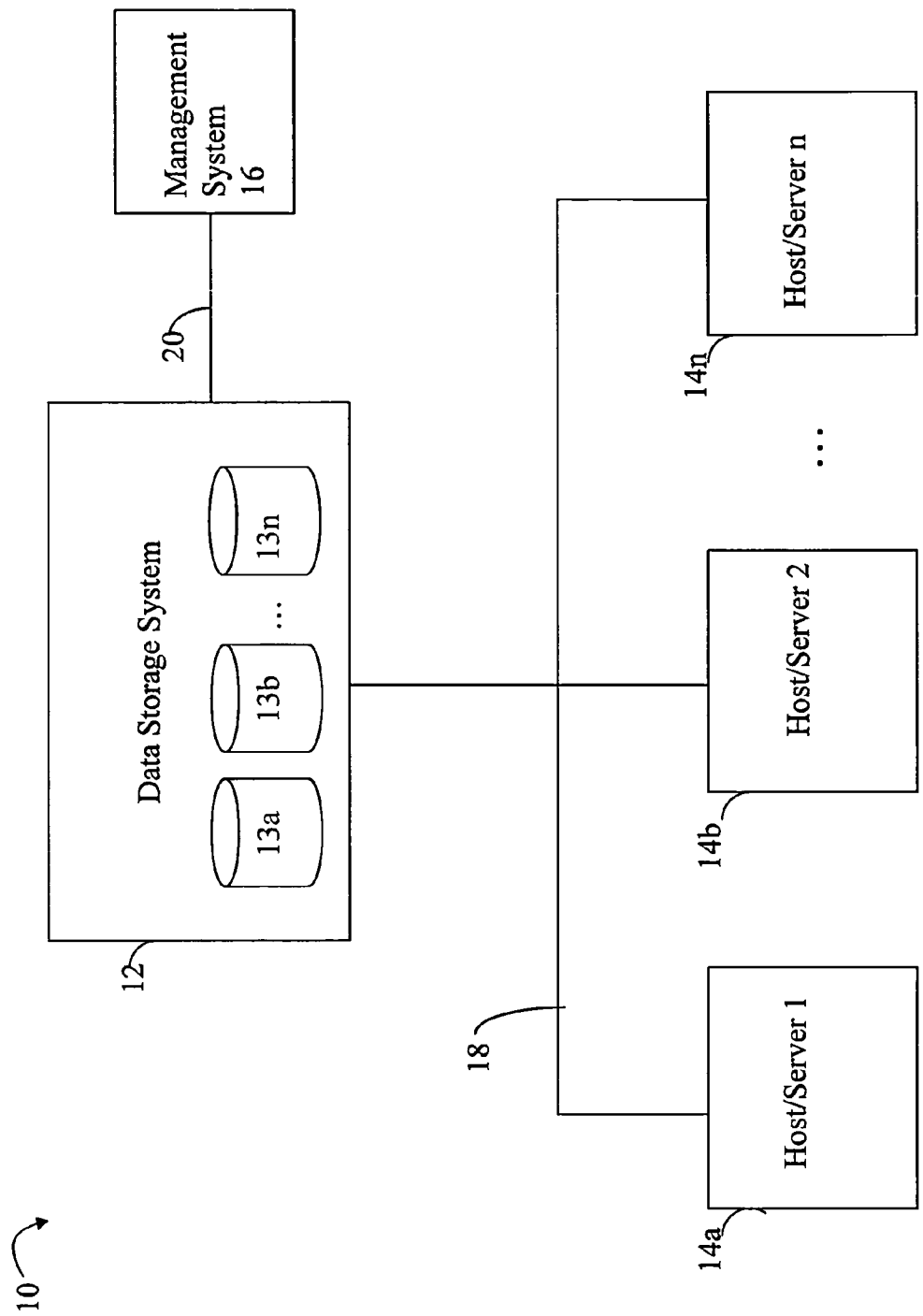
FIG. 1 is an example of an embodiment of a system that may utilize the techniques described herein.

Referring to FIG. 1, shown is an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 20. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the one or more data storage systems 12 of FIG. 1 may be an appliance with hardware and software for hosting the data storage of the one or more applications executing on the hosts 14a-14n. The appliance may include one or more storage processors and one or more devices upon which data is stored. The appliance may include software used in connection with performing data storage administration and other tasks such as storing the data of the hosts on the appliance, configuring the data storage for use by the hosts, backing up data from the storage system, and the like. As an example in connection with an email application server component that may, executed on the hosts 14a-14n, the data storage configuration tasks may include allocating storage for user accounts or mailboxes, specifying the devices (logical and/or physical) used to store the email data, specifying whether data replication is performed for disaster recovery, and the like.

In connection with an embodiment in which the data storage 12 is an appliance including hardware and software, the appliance may also include other software for performing different data services. For example, the appliance may include backup server software which interacts with software on the hosts 14a-14n when performing a backup operation.

In another embodiment, the data storage systems 12 may include one or more data storage systems such as one or more of the data storage systems, such as data storage arrays, offered by EMC Corporation of Hopkinton, Mass. Each of the data storage systems may include one or more data storage devices 13a-13n, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes 13a-13n. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

In following paragraphs, reference may be made to a particular embodiment such as, for example, an embodiment in which element 12 of FIG. 1 is an appliance as described above. However, it will be appreciated by those skilled in the art that this is for purposes of illustration and should not be construed as a limitation of the techniques herein.

Data may be stored on one or more data storage system in accordance with any one or more different data models. The data storage system may store data, for example, as objects and the data may be used by multiple applications and/or hosts as clients or tenants. Thus, the data storage system may provide data storage in a multi-tenant environment. Individuals may need to access different portions of the data and there is a need to restrict or control an individual's access to appropriate portions of the data. Described in following paragraphs are techniques that may be used to control access to data where such techniques also provide a sufficient granularity of control as may be needed in complex data storage systems and/or complex data storage environments. Such techniques may be used in connection with individual users performing, for example, data storage administration.

Described in following paragraphs are techniques that may be used in connection with a data object model that may be characterized as having multiple dimensions. Although the data object model described in accordance with techniques herein has a variety of uses, in one embodiment, the data object model described in accordance with techniques herein may be used to describe accessibility to objects, attributes, and the like, used for managing a system, such as a data storage system. As an example, an embodiment of the data object model in accordance with techniques herein may define one or more objects representing an application, data storage areas used for storing application data, operations performed on the application data and storage areas in connection with storage management, and attributes that may be viewed, modified, and the like, in connection with performing data storage management tasks. A user, such as a data storage administrator, which has access to particular objects, attributes, methods, etc. is permitted to perform various operations for data storage system management as indicated by the appropriate objects, attributes, methods, and the like, to which the user has access. To further illustrate, the data model may be used to represent an email application, data stored by the email application on the data storage system, and what operations, tasks, and the like, may be performed on the data areas used for storing the application data, what attributes characterize such data areas (e.g., which particular LUNs are used for storage, the RAID level (e.g., RAID-1, RAID-6, etc.) and configuration (e.g., number of data and parity devices) for such data areas, the data protection process performed such as snapshot, backup, etc., for such data areas. In accordance with techniques herein, a user such as a data storage administrator may be allowed to access particular objects, methods, attributes, and the like, where such allowed access to a particular object, method, etc., indicates that the user can perform, for example, the associated method for the object, perform a particular operation for one of the object attributes, and so on. Thus, by permitting a user to have access to selected objects, methods, and attributes, the data object model may be used to describe the operations the user is allowed to perform for data management, the attributes the user is allowed to view, modify, or otherwise operate on to perform data management, and the like. These and other uses of the techniques herein will become apparent to those skilled in the art with the benefit of further description as set forth in following paragraphs. Although the data model may be described herein with one or more particular applications and uses, the techniques herein should not be construed as limited to these presented herein for illustration and example.

Figure 2:
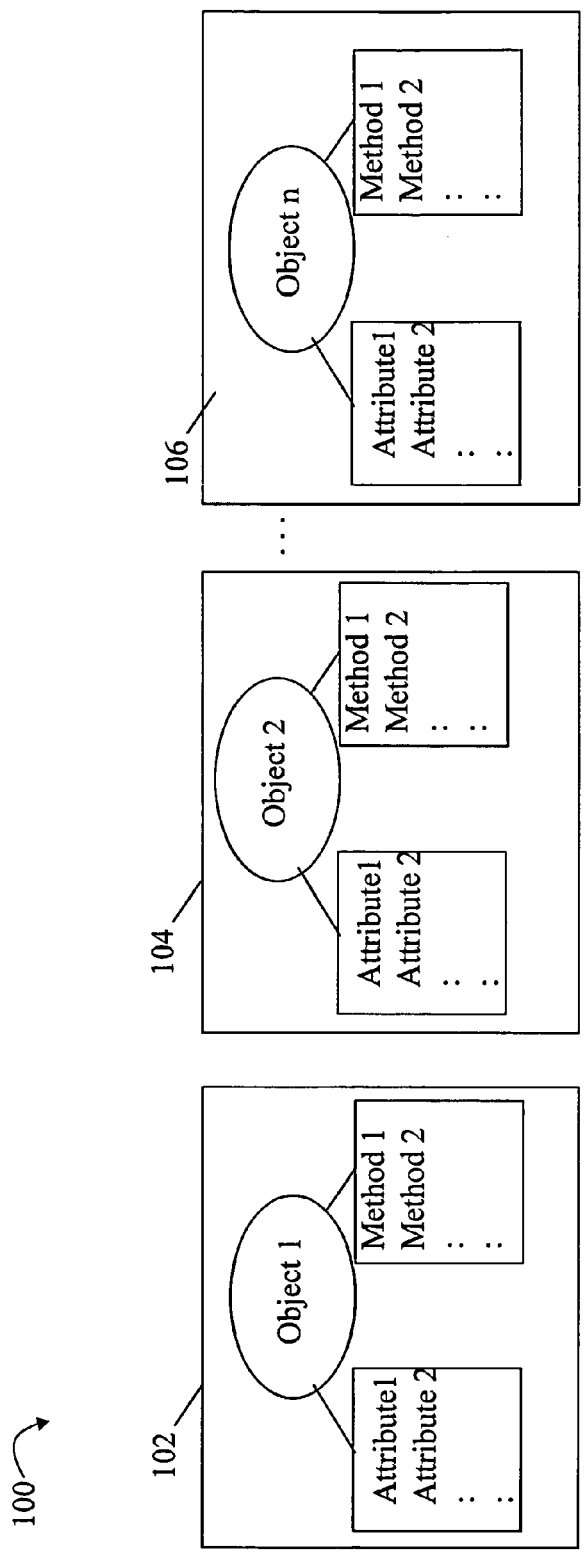
FIGS. 2-6 illustrate different dimensions that may be associated with a data model in accordance with techniques herein.

Referring to FIG. 2, shown is an example illustrating a first type of dimension of an object model. Shown in the example 100 are a plurality of objects 1-n, denoted 102-106. Each object may include associated attributes and methods. As known in the art, attributes describe or characterize different aspects of the object. An object's methods may be invoked to perform operations on the object such as, for example, to create an object, update data of the object, display information about the object, and the like. The objects 102-106 in the example 100 may be characterized as raw or basic objects included in a flat, enumerable namespace.

In a system having an object model based on only the first dimension of FIG. 2, any user may access any object, examine and/or operate on any attribute, and invoke any method.

Figure 3:
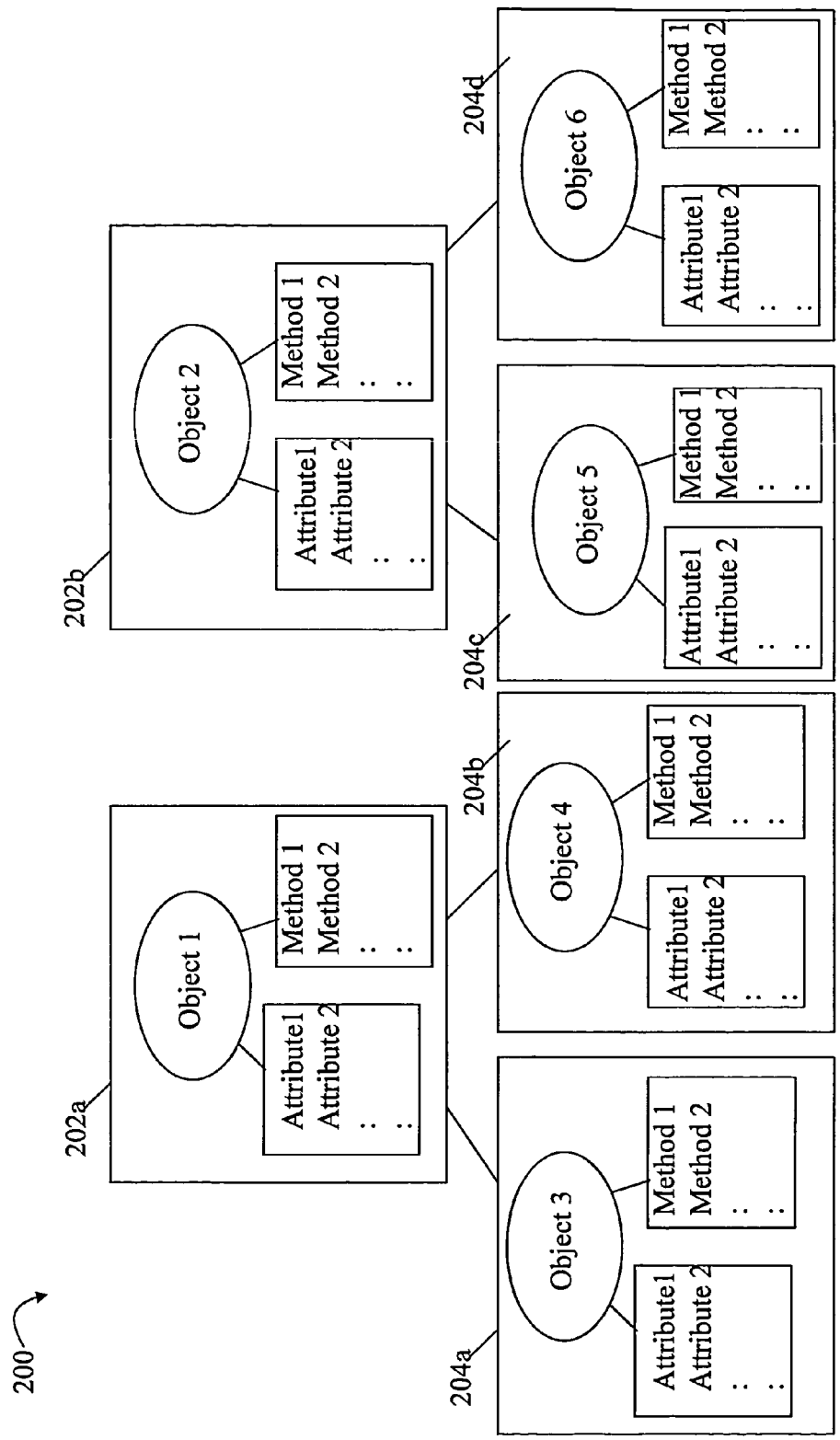

Referring to FIG. 3, shown is an example illustrating a second type of dimension of an object model which builds upon the first dimension and objects of FIG. 2. Shown in the example 200 are a plurality of objects 202a, 202b, and 204a-204d. Elements 204a-204d may represent raw or basic objects as illustrated in FIG. 2. Elements 202a and 202b may represent composite objects which form a hierarchical object model. Each of the composite objects 202a, 202b may have attributes and methods. Additionally, each composite object 202a and 202b may be associated with one or more raw or basic objects. It should be noted that a composite object may be associated with any number of raw or basic objects rather than just two as illustrated in the example 200. Furthermore, the hierarchical object model may have more than two levels as illustrated. For example, there may be three levels or more in the object model hierarchy depending on the associations between objects. As an example of a three level object model, a first composite object may be associated with a second composite object, where the second composite object may be associated with several raw or basic objects. As a variation with reference to the example 200, the foregoing may be illustrated by having yet another object 7 associated with object 3 (204a) so that 202a and 204a are composite objects and 204b and the new object 7 are raw or basic objects.

An association between two objects may represent any type of relationship between the objects. For example, a composite object may be an object representing an email application such as Microsoft Exchange. The composite object may be associated with three raw objects—2 LUN objects and a third object that is a cache or database object. The foregoing three raw objects may also be characterized as child objects of the composite object. The raw objects may represent data storage areas used by the email application, where the email application is represented by the composite object.

In a system having an object model based on only the dimensions of FIG. 3, any user may access any composite object and its associated raw objects. Any user may also examine and/or operate on any attribute and invoke any method of any such composite object and its associated raw objects.

Figure 4:
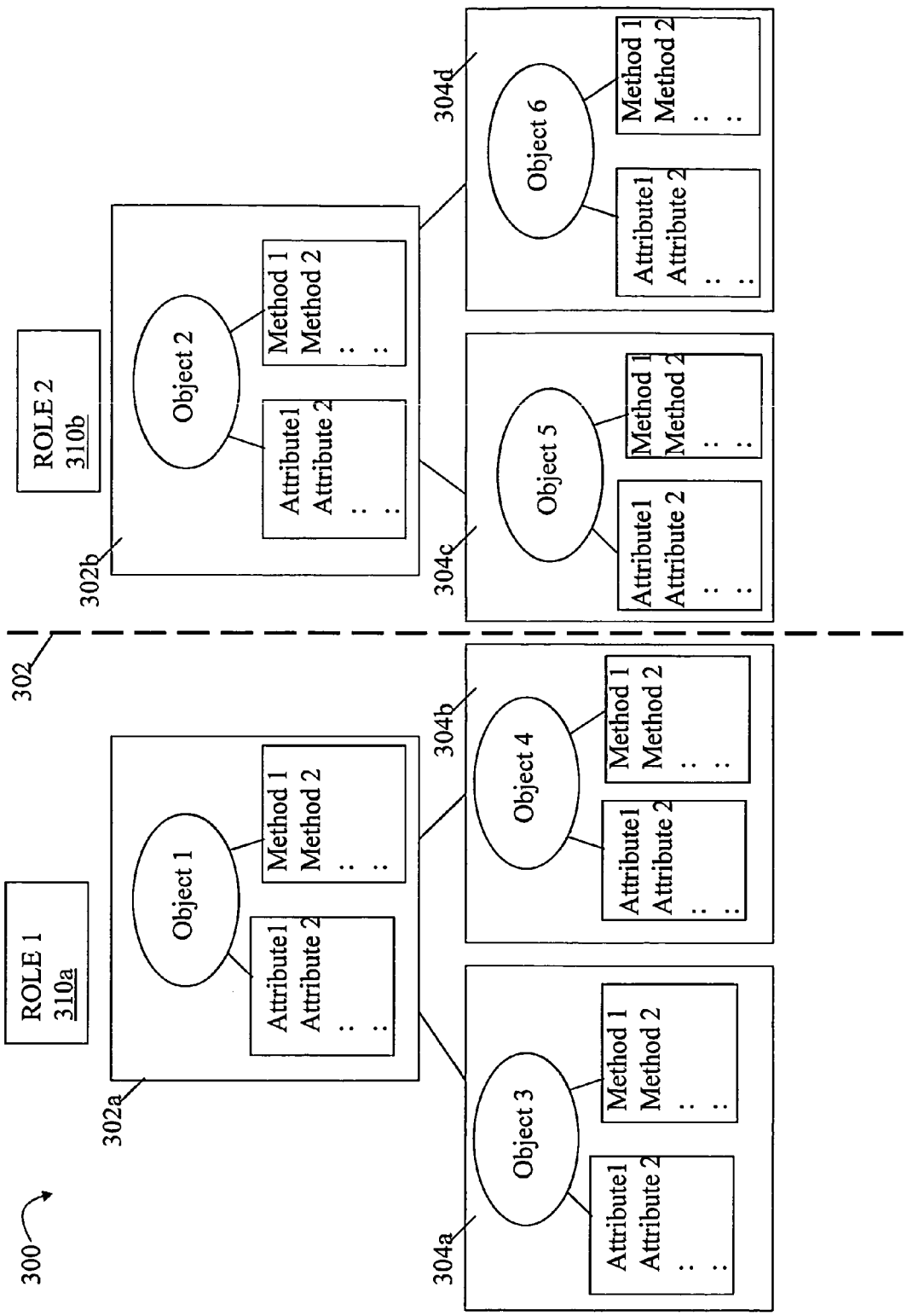

Referring to FIG. 4, shown is an example illustrating a third type of dimension of an object model which builds upon that as described above in connection with FIGS. 2 and 3. Shown in the example 300 are a plurality of objects 302, 302b, and 304a-304d. Elements 304a-304d may represent raw or basic objects. Elements 302a and 302b may represent composite objects. In the example 300, roles may be used to restrict access to a portion of the existing objects. Each of the defined roles may relate to one or more aspects such as related to one or more of a job function, title, particular technical area(s), particular application(s), and the like. For example, a first role of application 1 administrator may perform data storage administration tasks for a first application. A second role of application 2 administrator may similarly perform data storage administration tasks for a second application different from the first application. The tasks performed by any user having role 1 or role 2 may include performing data storage provisioning, backup and restoration operations, and the like. Each of the foregoing two defined roles each represented by one of 310a and 310b. A user assigned role 310a may have restricted access to a portion of existing objects such as to the left of the dashed line 302. A user assigned role 310b may have restricted access to a portion of existing objects such as to the right of the dashed line 302. Thus, roles may be used to control or restrict an assigned user's access to a subset of existing objects.

In a system having an object model based on only the dimensions of FIG. 4, access to composite objects, their associated raw objects, and any attribute and method thereof may be restricted based on roles. Thus, roles may be used to restrict or limit breadth with respect to all information associated with an object (e.g., allow/disallow access to an object and all its associated information (e.g., all associated objects, methods and attributes). However, roles may disallow or restrict access to only a portion of information associated with an object. In other words, a role may be used to allow/disallow access to an object and all its associated information but may not allow a sufficient granularity of control to allow/disallow access to only a portion of information associated with an object such as allow access to the composite object but not one or more associated raw objects, allow access to only some of the attributes and/or methods of the composite object or any of its associated raw objects, and the like.

Figure 5:
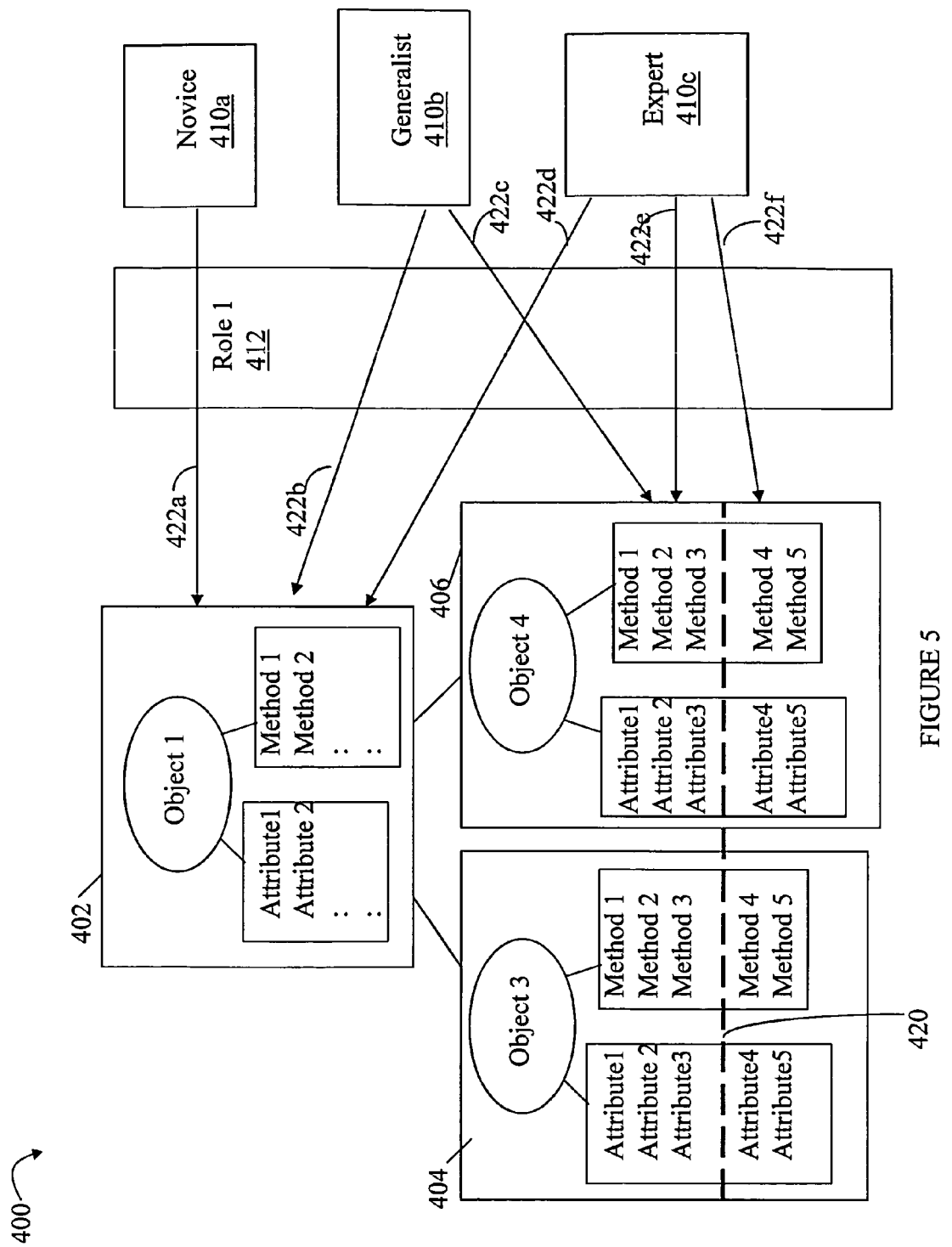

Referring to FIG. 5, shown is an example illustrating a fourth type of dimension of an object model which builds upon that as described above in connection with FIGS. 2, 3 and 4. Shown in the example 400 are a plurality of objects 402, 404 and 406. Elements 404 and 406 may represent raw or basic objects. Element 402 may represent a composite object. Element 412 may represent a single defined role, role 1. For each defined role, one or more levels of proficiency or skill may be also be specified. In the example 400, three skill levels are specified and denoted (in increasing order of skill or proficiency) as novice 410a, generalist or intermediate 410b and expert 410c. The fourth type of dimension allows for specifying different variations in skill level for a single role. Due to the varying levels of skill, each of 410a-410c for a single role may have varying levels of allowed access to objects and associated information.

The knowledge or skill levels 410a-410c may provide an additional level of filtering or access to composite objects, raw objects, and/or attributes and methods thereof. As described above, roles by themselves may not provide a sufficient granularity of control in that roles may not allow for specifying or restricting access to only some of the information associated with a particular object. Knowledge or skill levels in combination with roles may be used to limit access to only a portion of information associated with a single object, such as a composite object. In other words, roles and skill levels may be used to provide a sufficient granularity of control to allow/disallow access to only a portion of information associated with an object such as allow access to a composite object but not one or more associated raw objects, allow access to only some of the attributes and/or methods of the composite object or any of its associated raw objects, and the like. Thus, use of roles and skill levels may be used to provide a finer granularity of access control than roles alone with respect to both breadth and depth of existing objects. Depth may refer to limiting access with respect to information associated with a particular object (e.g. limiting access to an associated object such as a raw object associated with a composite object, or limiting access to attributes and methods of an object (e.g., composite or raw object) or one of its associated objects (e.g., raw object)).

As denoted by arrow 422a, a novice 410a may be allowed to only access composite object 402 and the attributes and methods of 402. However, the novice 410a may not be allowed to access associated raw objects 404 and 406, or any attribute or method thereof. As denoted by 422b and 422c, generalist 410b may be allowed to access composite object 402 (and attributes and methods of 402) and only a portion of the information for raw objects 404 and 406. As illustrated, the generalist 410b is allowed to access attributes and methods of 404 and 406 which are above the line 420. However, generalist 410b cannot access attributes 4, 5 and methods 4, 5 of objects 404 and 406. As denoted by 422d, 422e and 422f, expert 410c may be allowed to access all objects 402, 404 and 406 and any attribute and method thereof. Thus, a user assigned role 1 412 and expert level 410c is allowed unrestricted access to all objects, attributes and methods of the example 400.

To further illustrate, a first role (role 1 412) defined as general data storage administrator may perform data storage administration tasks for several different applications. The tasks may include performing data storage provisioning, backup and restoration operations, and the like for multiple applications. A user having the first role may be required to have access to object 402. However, the particular operations or tasks that may be performed by a data storage administrator assigned role 1 and having a beginner or novice level 410a of skill may be restricted in comparison to either of 410b and 410c denoting a higher level of skill and proficiency. A novice may be restricted for a variety of different reasons so that the novice user is not allowed to perform operations requiring greater skill and knowledge, is not able to display information and detail (e.g., particular attributes) about which he/she may know nothing, and the like. As skill level increases, the amount of information, types of allowed operations, level of detail, and the like, may also accordingly increase or vary.

It should be noted that different levels of proficiency or skill and roles are described, for example, in U.S. Pat. No. 7,523,231 which issued on Apr. 21, 2009, entitled Application Aware Storage, (the '231 patent), which is incorporated by reference herein, and U.S. patent application Ser. No. 11/906,131, filed Sep. 28, 2007, Gupta, et al., entitled Security and Licensing with Application Aware Storage, which is incorporated by reference herein.

Although three skill or proficiency levels are illustrated in the example of FIG. 5, an embodiment may provide for specifying any number of such levels for each role. It should be noted that use of terminology regarding a level of skill or proficiency may also be referred to herein as a level of knowledge and/or expertise.

Figure 6:
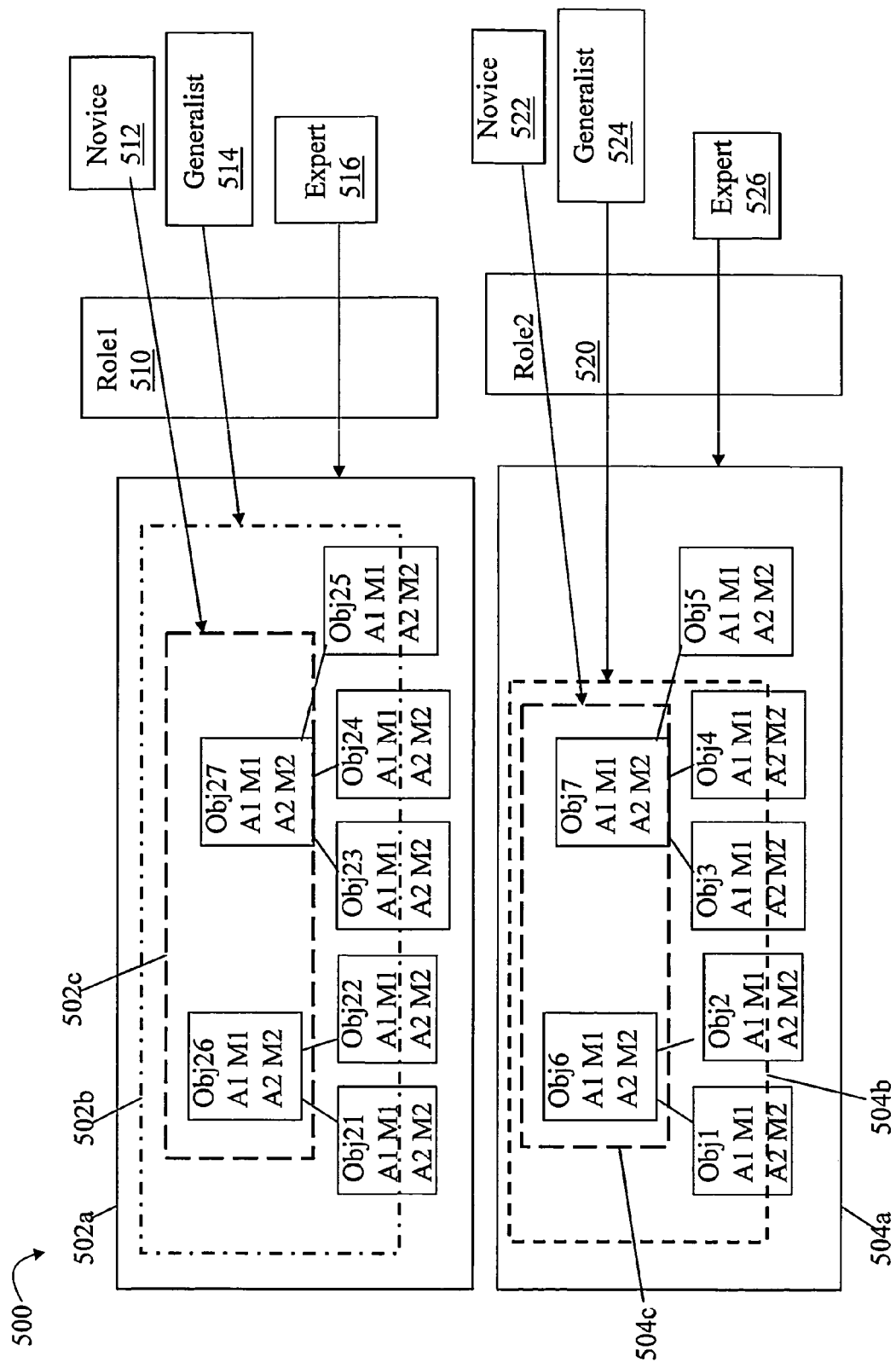

Referring to FIG. 6, shown is an example illustrating a fifth type of dimension of an object model which builds upon that as described above in connection with FIGS. 2, 3, 4 and 5. The example 500 illustrates an embodiment having multiple instances of roles and associated skill or proficiency levels for each such role. Furthermore, the example 500 identifies which objects and associated information are accessible for each skill level of a role. In accordance with techniques herein, an embodiment may define a template for each such role. The template may define the one or more associated skill levels applicable for use with the role. The template may also specify, for each of the skill levels of a role, which objects, related child objects, and object information (e.g., attributes and/or methods of the object, attributed and/or methods of a related object) are accessible. An embodiment may include, or otherwise provide for creating, a plurality of such templates, where each such template is defined for a particular role. The template for a role may then be used in connection with specifying which objects are accessible to a user, where the user has an account, user identifier, and the like, which is assigned the particular role and one of the skill levels for the role.

In the example 500, an object (obj) and its identifier (N, N being an integer) are denoted as "objN" (e.g., obj26), each attribute (A) and its associated identifier (n, n being an integer) are denoted as "An" (e.g., A1), and each method (M) and its associated identifier (n, n being an integer) are denoted as "Mn" (e.g., M1).

With reference to FIG. 6, the example 500 includes role 1 510 and associated skill levels (512, 514 and 516), and role 2 520 and associated skill levels (522, 524 and 526). A first template may be defined for role 1 510 identifying the skill levels 512, 514 and 516 and specifying the objects and object information accessible for each such skill level. For a user assigned role 1 510, novice level 512, the user can access the objects and object information included in dashed box 502c (e.g., objects 26 and 27 (obj26 and obj27) and the attributes and methods of objects 26 and 27). For a user assigned role 1

510, generalist level 514, the user can access the objects and object information included in dashed box 502b (e.g., objects 26 and 27, all attributes and methods of objects 26 and 27, and attribute 1 (A1) and method1 (M1) of objects 21, 22, 23, 24 and 25). However, generalist 514 cannot access attribute 2 (A2) and method2 (M2) of objects 21, 22, 23, 24 and 25. For a user assigned role 1 510, expert level 516, the user can access all objects and object information included in box 502a (e.g., objects 21-27 and all attributes and methods thereof).

A second template may be defined for role 2 520 identifying the skill levels 522, 524 and 526 and specifying the objects and object information accessible for each such skill level. For a user assigned role 2 520, novice level 522, the user can access the objects and object information included in dashed box 504c (e.g., objects 6 and 7 and the attributes and methods of objects 6 and 7). For a user assigned role 2 520, generalist level 524, the user can access the objects and object information included in dashed box 504b (e.g., objects 6 and 7, all attributes and methods of objects 6 and 7, and attribute 1 (A1) and method1 (M1) of objects 1-4). However, generalist 524 cannot access attribute 2 (A2) and method2 (M2) of objects 1-4 and cannot access anything regarding object 5. For a user assigned role 2 520, expert level 526, the user can access all objects and object information included in box 504a (e.g., objects 1-7 and all attributes and methods thereof).

As a variation to the foregoing, a single template may be defined for each possible combination of role and level of expertise. With reference to FIG. 6 with this variation, 3 templates may be defined for role 1 510 and 3 templates may be defined for role 2 520. This variation may be a matter of how templates are implemented in an embodiment for each role.

Thus, although examples provided herein for illustration may refer to a single template for a role, it should be noted that an embodiment may implement the techniques herein with a different template for each combination of role and level of expertise.

In connection with techniques herein, templates may be used to provide a multi-dimensional data model. The templates may be used to provide an object model and implement a flexible data management framework for restricting or filtering access to selected objects (e.g., composite, and related objects) and/or selected portions of object information (e.g., object attributes and methods) for a user assigned a role and an associated level of expertise. As also described in following paragraphs, an embodiment may also use other criteria in addition to the role and level of expertise in defining a template and filtering access to selected objects and/or object information. As set forth in more detail below, such other filtering criteria may relate to, for example, particular application(s) identified and other indicator(s) used to infer a level of expertise. The other indicators may relate to the complexity of the data storage system and/or data storage environment as well as the identified applications.

Figure 7:
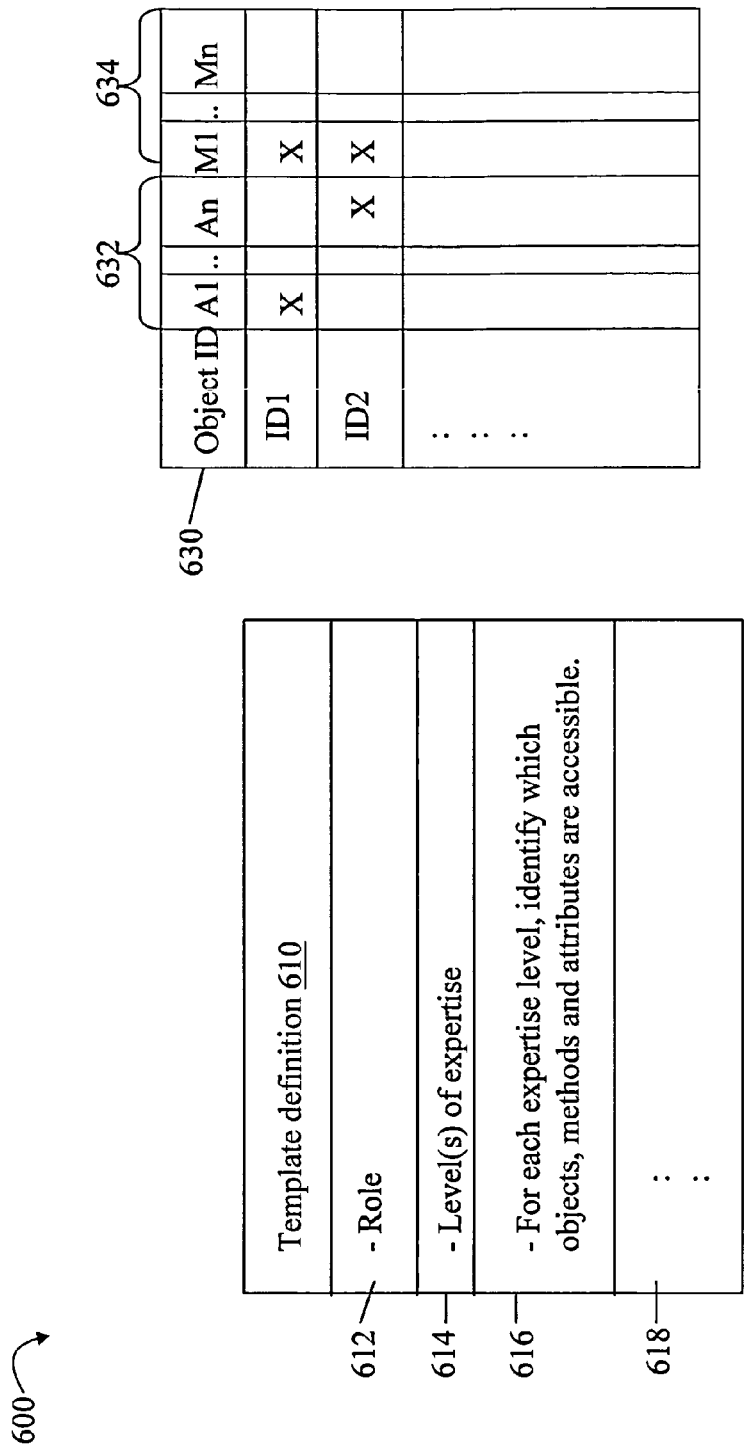
FIG. 7 is an example illustrating a template definition in an embodiment in accordance with techniques herein.

Referring to FIG. 7, shown is an example of information that may be used in connection with creating a template definition in an embodiment in accordance with techniques herein. The example 600 includes a template definition 610 including a role 612, one or more of levels of expertise 614, and accessible objects 616 for each expertise level of 614. The template definition 610 may also include other information 618. In this example 600, an embodiment may create a single instance of 610 for each role. Element 612 represents the name of the role, such as "Email application 1 administrator" for performing data storage administration tasks for a particular email application such as Microsoft Exchange, database administrator for performing data storage administration for one or more database applications, and the like. Element 614 may represent the one or more levels of expertise for the role identified in 612. Element 614 may identify three levels such as novice, generalist and expert illustrated in FIG. 5.

Element 616 may identify, for each expertise level of 614, which objects (including composite and raw objects), and object information (e.g., attributes, methods, and the like) for each object are accessible. A type of allowed access or operation (e.g., read, write, delete, create, etc) that may be performed on an object or attribute may be specified by having 616 indicate access to invoke a particular method. An embodiment may represent the information of 616 for each expertise level of 614 in a variety of different ways. Element 630 is one example of how an embodiment may specify what objects, attributes, methods, and the like, are accessible for an expertise level 614. An instance of 630 may be specified for each expertise level denoted in 614. Element 630 is a table listing each object and the attributes 632 and methods 634 defined for each object. Each object may be represented by a unique object identifier, denoted as object ID in the first column of 630. In one embodiment, the object ID as used in the first column of 630 may be a class name, such as a class name of a class used with a programming language such as C, C++, Java, and the like. A user creating a template may be presented with a table 630 of existing objects and may select which objects, methods and attributes are accessible for a particular role and expertise level. For example, with reference back to FIG. 6 for role 1 510, an instance of table 630 may be specified for each of the levels 512, 514 and 516. The table 630 for role 1 510, novice 512 may indicate access to objects 26 and 27 and all methods and attributes thereof. Access for a particular attribute or method of an object may be denoted with an X in the appropriate table entries.

Other embodiments may provide different ways in which permissible access to objects, methods, attributes, and the like, may be specified. For example, specifying access to a particular object which is a composite object may, by default, also provide access to all related objects, and the attributes and methods of the composite object and all the related objects. When creating a template, a user may be asked for additional information such as to identify the particular application(s) for which the role is performing administration. At the time of template creation, a system may have defined object groupings and/or object information where a particular object grouping and/or object information is associated with an application. As such, a user creating a template may indicate that the role 612 performs management for applications 1 and 2. A first group of existing objects may be defined for application 1 and a second group of existing objects may be defined for application 2. The user may be presented with a table 630 populated with information for the first and second groups of objects appropriate for applications 1 and 2. The user may select which objects, attributes, and methods of the first and second groups are accessible for each combination of role and level of expertise. In this way, the table 630 may be selectively populated initially with a first set of objects and object information. In an embodiment, the user may be allowed to further modify the table, such as by adding one or more objects, object groupings, and the like.

When creating the template, the user may be asked for additional information such as related to the complexity of the data storage system and/or data storage environment. For example, the user may asked to enter information regarding a number of data storage systems being managed, which application(s) have data host on the data storage systems, and the like as described in more detail elsewhere herein. This information may be used to assess a level of expertise rather than have a user directly select a level. In other words, code may be executed to obtain the additional information (either from the user via user data entry and/or through configuration files describing the data storage system and/or environment) characterizing aspects related to the complexity of the data storage system and/or data storage environment. The code may automate selection of a level of expertise based on this additional information.

An embodiment may also store the additional information obtained such as related to the particular applications, the complexity of a particular application, the complexity of the data storage system and/or data storage environment, and the like, as part of the template definition in 618. As described in more detail below, this additional information, along with the role, and/or possibly other keywords associated with the template, may be used as matching criteria when later searching for a matching existing template for association with a user identifier or user account.

The additional information as well as information of fields 612 and 614 that may be obtained as part of template creation may also be used to further identifying objects and/or object information that may included by default in the table 630. For example, as described above, a level of expertise may be specified either through direct user selection or indirectly through automated means of code execution. An embodiment may have sets of predefined groupings of objects and/or object information for particular applications. Furthermore, a variation of such sets of predefined groupings may exist for different levels of expertise. To illustrate, a first set of objects and/or object information may be defined for a particular application. Once a level of expertise is determined, this first set may be further varied depending on the level. The first set may be defined and, depending on the level of expertise, different child objects and/or object information may be exposed to the user. Higher levels of expertise are provided with greater in-depth exposure (e.g., the higher the level of expertise, the greater the in-depth exposure to child objects and/or object information). The foregoing first set or variation thereof for level of expertise may be used to populate table 630 when identifying which objects and object information are accessible.

Figure 8:
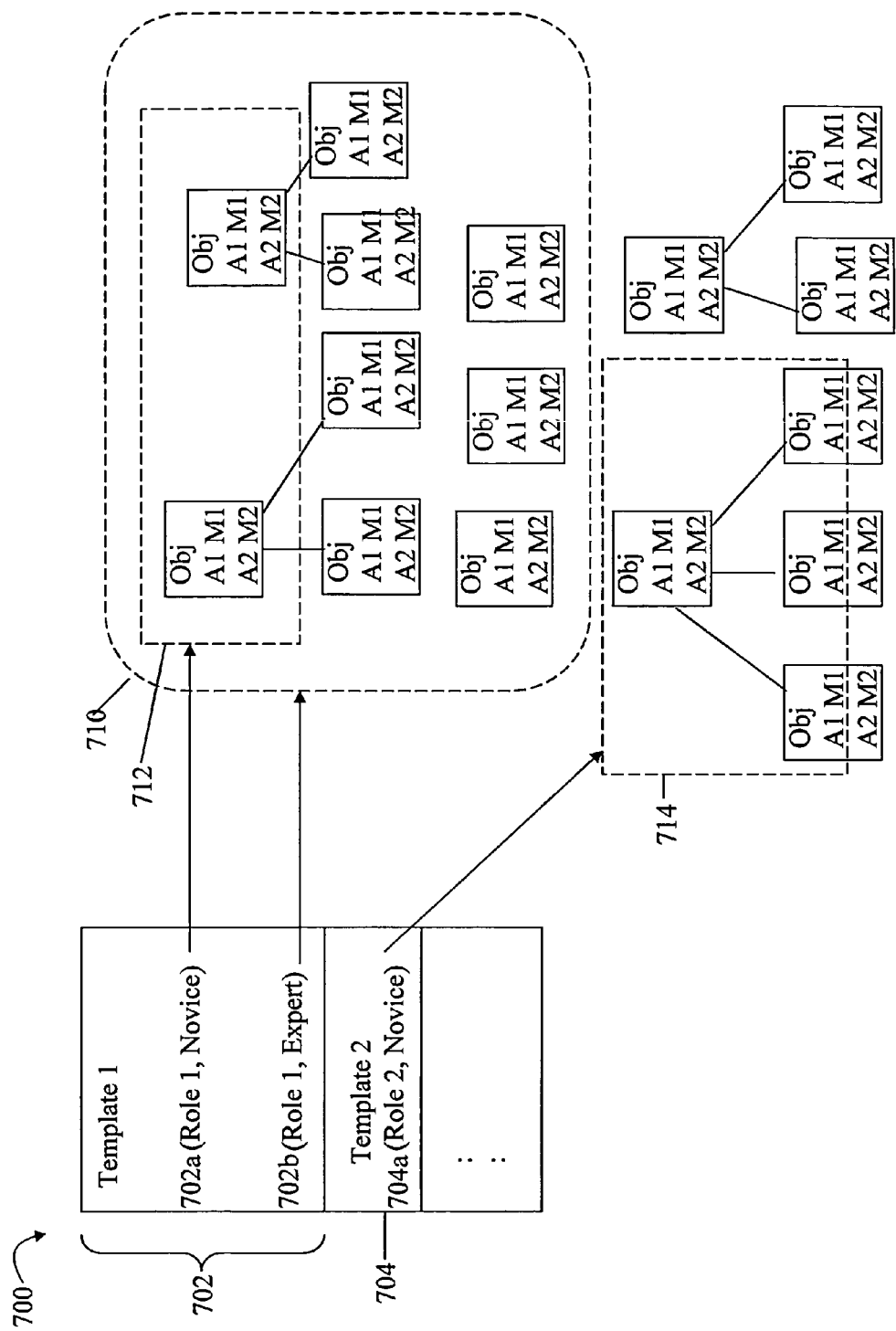
FIG. 8 is an example illustrating use of templates as filters to restrict access to objects and object information in an embodiment in accordance with techniques herein.

Referring to FIG. 8, shown is an example further representing how a template may be used to provide access to a portion of existing objects and object information in an embodiment in accordance with techniques herein. The example 700 provides an illustration of using a template as described above to provide or filter access to a portion of existing objects and object information. The object access model is specified using one or more defined templates where each template identifies or specifies allowable access to a subset of existing objects and object information for each combination of role and level of expertise. In connection with example 700, there may be two templates defined—template 1 702 and template 2 704. Template 1 702 may be defined for role 1 having two expertise levels: novice and expert. Element 702*a* may represent the table or other information of template 1 specifying the objects and object information of 712 accessible for role 1, novice. Element 702*b* may represent the table or other information of template 1 specifying the objects and object information of 710 accessible for role 1, expert. Template 2 704 may be defined for role 2 having one expertise level of novice. Element 704*a* may represent the table or other information of template 2 specifying the objects and object information of 714 accessible for role 2, novice.

It should be noted that although FIG. 8 and other herein illustrate each role has having access to objects which are not accessible using any other role, this may vary with an embodiment and should be construed as a limitation of techniques herein. For example, a set of objects and/or object information may be accessible using different multiple roles using different templates.

Figure 9:
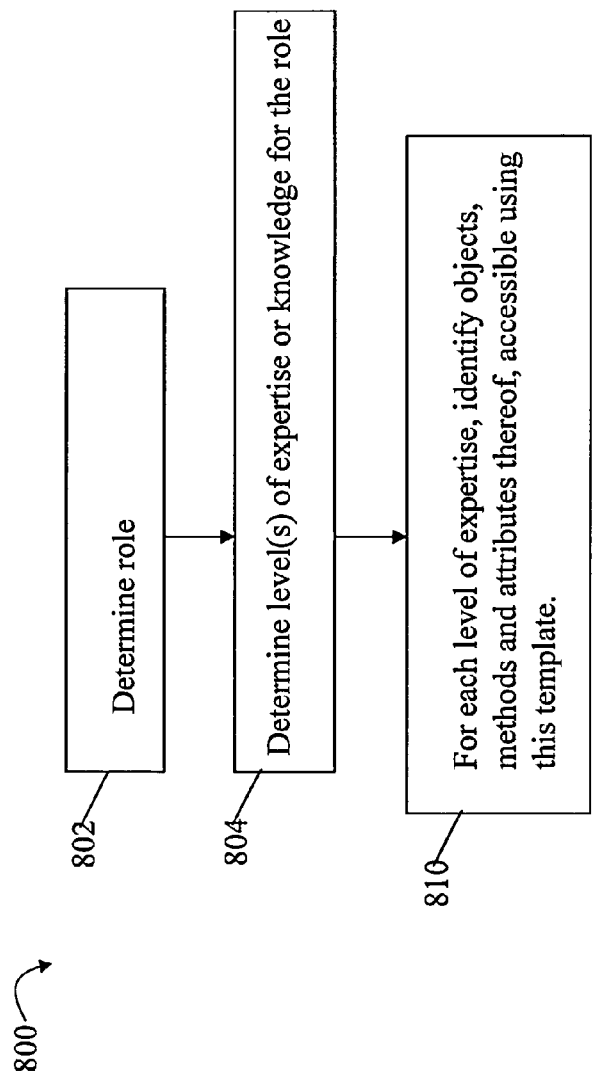
FIGS. 9 and 10 are flowcharts of processing steps that may be performed in an embodiment in accordance with techniques herein.

Referring to FIG. 9, shown is a flowchart of processing steps that may be performed in an embodiment in creating a template in accordance with techniques herein. The flowchart 800 summarizes processing described above for creating or building a single template for a role. At step 802, the role is determined. Step 802 may include specifying a name or other description for the role whose template is being created. At step 804, one or more levels of expertise or knowledge are specified for the role. As described above, examples of such levels may include novice, generalist or intermediate, and expert or advanced. At step 810, objects and object information are identified for each expertise level of 804. Such information identified for an expertise level may be stored, for example, in a table such as 630 of FIG. 7 indicating which objects and object information are accessible for the combination of role and level of expertise. Once step 810 has been performed for each level of 804, the template may be saved and stored, for example, in a template database or any other type of data container.

The processing of flowchart 800 may be implemented using a computer-driven user-dialogue (e.g., with data input and output) such as with a script, graphical user interface displays of a wizard, and the like.

Once a template has been created, the template and one of the levels of expertise may be associated with a user identifier. The user identifier may be presented as part of the credentials or authentication information when using a data storage system for performing different tasks, such as data administration tasks. When a user logs in or otherwise performs processing on the data storage system using the user identifier, the associated template may be used to restrict access for that particular user identifier to the objects and object information specified in the associated template. In connection with selecting a particular template, such as in connection with creating a new user account and associated user identifier or modifying an existing user account having an associated user identifier, information regarding existing templates and associated levels of expertise may be presented to a user as part of a dialogue. From the presented information, a template and associated level of expertise may be selected for the particular user identifier and account. It should be noted that more than one role and associated level of expertise may be selected and associated with a particular user identifier. For example, a particular user may perform operations associated with multiple different roles.

An embodiment may include a dialogue for template selection where the user selects a template and level of expertise. Additionally, in an effort to further assist in template usage and selection, the dialogue may provide a recommendation or a determination regarding level of expertise based on one or more other inputs. For example, a user performing account management may not know whether to select novice, intermediate or expert level. As such, the user performing account management may be prompted for other information used as criteria for recommending or having the dialogue automatically select one of the levels for a template. For example, the user may be prompted to enter other information or make selections indicating a level of complexity of the data storage system and/or applications being managed. An embodiment may also be able to automatically determine such information about a particular system such as from a configuration file. Variations in complexity as related to a particular data storage system arrangement and environment, applications for which a particular role or user perform data storage system management, and the like, may provide an indication regarding the level of knowledge or expertise of the user. For example, the additional information provided (either through user input and/or in an automated fashion without user input/selection) may identify a class, type, or commercial name of data storage system that may vary with complexity, whether the system managed includes multiple data storage systems (e.g., such as data storage arrays) networked together, whether the system has a large number and/or different types of storage devices, and the like. In order to perform management for particular classes of data storage systems, applications, and the like, a particular knowledge level may be presumed. For example, a data storage system and/or data storage system environment may be classified as having a relatively high level of complexity. For a role, three levels of expertise as illustrated in FIG. 6 may be specified. A user performing data storage system management for a system and/or environment categorized as having the high level of complexity may be presumed to have a minimum knowledge level of "generalist". As such, executing code may process the additional information related to complexity of the system and select generalist as a level of expertise for use in connection with account creation.

Figure 10:
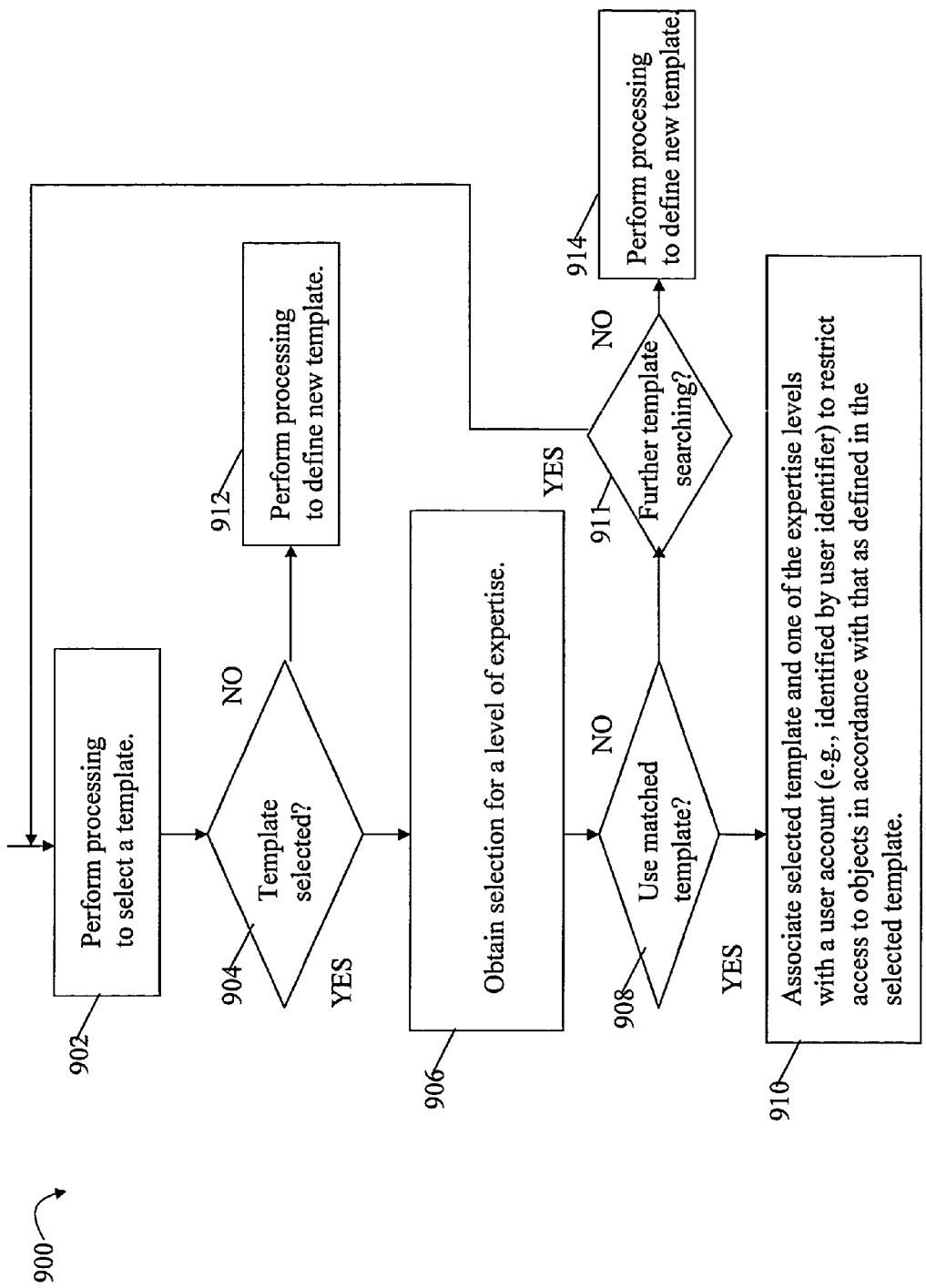

Referring to FIG. 10, shown is a flowchart of processing steps that may be performed in an embodiment in accordance with techniques herein using templates. The steps of 900 summarize processing described above in connection with selection and use of a template for a user account having an associated user identifier. Flowchart 900 assumes that one or more templates have already been created. At step 902, processing may be performed to select a single template. Step 902 may include a user manually selecting one of the existing templates after displaying a list of templates and/or information about such templates to the user. It should also be noted that an embodiment may perform additional processing to assist in selection of a single template. For example, as a variation to that described above, template creation may include specifying template matching criteria. Such criteria may include the role, one or more other keywords which are associated with the template, particular application(s), information regarding the complexity of the data storage system and/or data storage environment, and the like. Step 902 may include querying a database or other data container of the existing templates rather than previewing a list of all existing templates. The user may enter one or more query terms. A search is performed using the query terms with respect to matching criteria (e.g., keywords, roles, and other information such as may be included in 618 of the template definition described above in connection with FIG. 7) associated with existing templates to determine if there are any matches between the query terms and the matching criteria for existing templates. Those one or more templates having matching criteria which match the query terms may be displayed and a user may select a template from the displayed list.

At step 904, a determination is made as to whether a template selection has been made. In one embodiment after performing step 902, a user may either select an existing template or otherwise select an option to create a new template, for example, if a desired template does not already exist (as determined by step 902 processing). If step 904 evaluates to no, control proceeds to step 912 where processing may be performed to create a new template. Step 912 may include performing processing as described above, for example, in connection with FIGS. 7 and 9. If step 904 evaluates to yes and a template has been selected, control proceeds to step 906. At step 906, once a user has selected a template, a selection for one of the levels of expertise in the template is made. A user may then be prompted at step 908 to confirm whether to proceed with the current selections for the template and level of expertise. If step 908 evaluates to no, control proceeds to step 911 where a determination is made as to whether the user wants to perform further template searching. If so, control proceeds to step 902. Otherwise, if step 911 evaluates to no, processing may continue with step 914 to define a new template. Step 914 processing is similar to step 912. If step 908 evaluates to yes, control proceeds to step 910 to associate the selected template and level of expertise with a selected user account and/or identifier. Subsequent to step 908, when a user performs processing, such as for data storage administration tasks, using the user account and/or identifier, the user has restricted access to objects in accordance with those specified in the selected template.

The template and level of expertise selection for a particular user (e.g., as may be identified with a user account and/or user identifier) may also be used in connection with performing filtering for a user interface. For example, the level of expertise may be used in connection with determining a level used for the UI as described in the '231 patent for Application Aware Storage mentioned above. The level of expertise and/or objects which are accessible per the selected template may be used in determining what operations can be performed, what information (e.g., attributes) can be displayed, and the like. Thus, the information and menu selections presented to a user may vary with template or role and level of expertise selected.

As noted above, an embodiment in accordance with techniques herein may create a single template for each combination of role and associated level of expertise so that a single template may specify accessible objects and object information for the combination.

Subsequent to initially specifying which objects and object information are accessible for a particular combination of role and associated level of expertise, the objects and/or object information may be updated. An embodiment may define different policies in connection with whether new objects and/or new object information is automatically accessible for particular templates, roles and/or levels of expertise, and the like.

Although the techniques herein are described with reference to a data model related to objects, the techniques herein using templates may also be applicable for use with other types of data models.

Described above is an example of a multi-dimensional object model as may be used in connection with facilitating management operations, such as, for example, in connection with data storage management. The foregoing multi-dimensional object model is also described, for example, in U.S. patent application Ser. No. 12/798,234, filed Mar. 31, 2010, MULTI-DIMENSIONAL OBJECT MODEL FOR STORAGE MANAGEMENT, which is incorporated by reference herein.

What will now be described are techniques that may be used in an embodiment in implementing the foregoing multi-dimensional object model using an object model description with qualifiers. In connection with following paragraphs, a composite class may refer to a class of a composite object as described and illustrated above. A composite class may be characterized as a first class definition which includes a member or field thereof which has a type of a second class. Thus, an object of the first class is a composite object having embedded therein a second object of the second class. The second object may also be referred to herein as a raw or basic object.

The second class may also be referred to as an embedded class with respect to the first class. The object model description may be included in a template as described elsewhere herein in more detail. The qualifiers may be used to specify one or more roles and/or one or more levels of expertise as may be included in an embodiment. The forgoing qualifiers may be used to identify which classes, attributes, methods, method parameters, and the like, are accessible to different roles and/or expertise levels. An embodiment may include one or more class definitions. The template may define a class and may specify which qualifiers are applicable to a class, attribute, method, and the like. For example, the template may specify qualifiers applicable to an entire class (e.g., including attributes and methods defined as members of the class and, if the class is a composite class including another embedded class as a member, any raw or basic objects associated therewith and included at a lower level in the object hierarchy), applicable to a single attribute or single method, to a single raw or basic object of a composite object, and the like.

It should be noted that as described above in an object model, a composite object may be an instance of a composite class including one or more members each having a type which is a class (e.g. embedded class). The composite object may be associated with one or more raw or basic objects which are hierarchically at a lower level in the object model than the composite object. For example, with reference back to FIG. 5, a hierarchical arrangement of objects is illustrated. Object 1 402 may be a composite object including raw or basic objects 404 and 406. Object 1 402 may be an object of a composite class including two members, where a first of the two members is a first class types corresponding to object 404 and a second of the two members is a second class type corresponding to object 406. The association between a composite object, such as 402, and a raw or basic object, such as each of 404 and 406, may represent one of a variety of different relationships (hierarchical and non-hierarchical) between objects in an embodiment. In one embodiment, a composite object may be a first object having one or more embedded objects (also referred to herein as subobjects). The one or more embedded objects may correspond, respectively, to one or more raw objects located at a lower level in the object model than the composite object. In this case, the class definition for the composite object may be a composite class that defines each of the one or more embedded objects of an embedded class type as a member or element of the class definition. More generally, the composite object-embedded object relationship (also the composite class-embedded class relationship) as described herein may be one type of relationship or association in an embodiment. It should be noted that although particular examples herein may refer to and illustrate the composite object-embedded object relationship, an embodiment in accordance with techniques herein may also have other types of relationships or associations between objects and classes of objects.

To illustrate the techniques herein with qualifiers in a template, an exemplary class definition will be considered in which the class definition may include as members any one or more attributes, methods, and/or embedded classes. It should be noted that an embedded class of a composite class may also be characterized as an attribute or property of the composite class.

For purposes of describing the scoping rules and application of qualifiers, an embodiment may consider the relationship between the class and any members defined in the class (e.g., contained or embedded within the class). The class (or objects of the class) may have a first qualifier scoping level and all members contained within the class (e.g., defined within the class definition) may have a second qualifier scoping level which is nested or contained within the first qualifier scoping level. An embodiment may write a template using a hierarchical description language having levels or depths corresponding to the foregoing qualifier scoping levels and qualifier scoping level hierarchy. With reference again to FIG. 5, object 1 402 may have a class definition which includes one or more attributes and methods used in connection with object 1 402. The class definition for object 1 402 may also define objects 404 and 406 as members of classes embedded within the class definition of object 402. Each of objects 404 and 406 may also include respective attributes and methods as illustrated. The classes (and objects which are instances of these classes), as well as attributes and methods, of a class definition form a qualifier scoping level hierarchy where the member classes embedded within a composite class may be considered at a same qualifier scoping level as a member attribute or method of the composite class. An embodiment may express the foregoing qualifier scoping hierarchy using a hierarchical description language with language elements, referred to herein as qualifiers, for specifying various roles and/or expertise levels.

Figure 11:
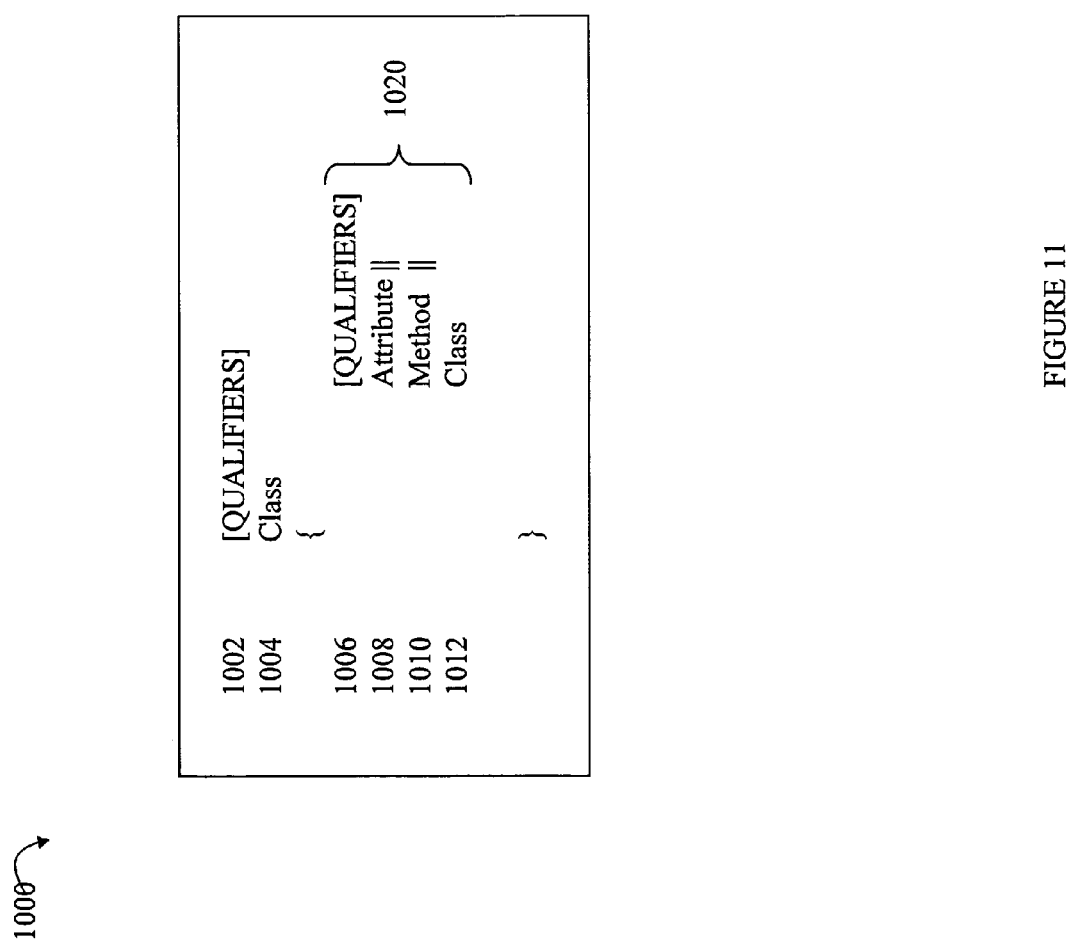

Referring to FIG. 11, shown is an example representation of a general format of a description language that may be used in a template in accordance with the techniques herein to describe a class definition and its members. The language may provide language elements in any one of a variety of different suitable syntaxes having a general format that may be expressed as in the example 1000. In the example 1000, line 1004 specifies a defined class name. The [QUALIFIERS] at line 1002 identify one or more optional qualifiers specifying roles and/or levels of expertise as applied to an object of the class 1004 and also members or items of the object's class. The class definition 1004 may include, for example, one or more attributes, methods or embedded classes (e.g., embedded objects) as members. The qualifiers of line 1002 are also applied to all of the foregoing members of the class 1004. Elements 1008, 1010 and 1012 represent that a single member or item 1020 within a class definition (line 1004) may be an attribute (line 1008), or a method (line 1010), or a class (line 1012). The "|" in the example 1000 represents the logical OR operator and that each member or item 1020 within the class 1004 may be one of the elements represented by lines 1008, 1010 and 1012. It should be noted that the language may also provide support for additional elements than as described and illustrated in FIG. 11 and elsewhere herein. Element 1006 identifies one or more optional qualifiers which are applicable to the item or member 1020. In accordance with the syntax of one embodiment described herein, the qualifiers of line 1002 are applied to all objects of the class of line 1004 and to all members or items embedded within the class at line 1004. The qualifiers of line 1006 are additionally applied to the single member or item as represented by 1020. It should be noted that if item 1020 has a class type and thus is an embedded object, the qualifiers of line 1006 have an applicable scope to all members or items embedded within the object 1020. An object of the class at line 1004 may have a first scoping level and items or members defined within the object's class are thus contained within object and have a second scoping level nested within the first scoping level. An additional third scoping level within the second scoping level may be associated with items or members of the class definition for the object at line 1012. More generally, an embodiment may have any number of qualifier scoping levels in accordance with an allowable number of nesting levels of embedded classes of objects or other data types. The foregoing is described and illustrated in more detail in following paragraphs.

A template may refer to class definition and there may be one or more objects which are elsewhere declared as instances or objects of a defined class. The template may include appropriate language elements to describe the attributes, objects, methods, and the like, defined as members of that class along with any optional qualifiers. In other words, the template may include multiple occurrences of item or member 1020 for a single object in accordance with the class definition for that particular object.

Referring to FIG. 12, shown is an example 1100 with additional detail of an exemplary template for a class definition "name 1". The class "name 1" at line 1104 has qualifiers specified at line 1102. The defined class, "name1" of 1104 includes attribute ATT1 (line 1108) with associated qualifiers at line 1106, attribute ATTN (line 1112) with associated qualifiers at line 1110, method Method1 (line 1116) with associated qualifiers at line 1114, and embedded object2 of class "name2" (line 1120) with its associated qualifiers at line 1118. Each of the optional qualifiers specified at lines 1102, 1106, 1110, 1114, and 1118 may identify one or more roles and/or levels of expertise. When a first object of class "name1" is instantiated, the first object has an embedded object2 of class "name2" as a field thereof.

As described above, qualifiers may have an applicable scope based on their associated qualifier scoping level and placement within the template in accordance with the object class definition(s). When a qualifier is specified for a class at a particular qualifier scoping level, the qualifier is applied to the entire class including all items or members of the class (e.g., all attributes, methods, and embedded classes contained within the class). When a qualifier is specified for a particular item or member of the class (e.g., item or member of the class definition), the qualifier is applied to that item or member. In the case where the item or member is an embedded object (e.g., member having a type which is a class), the qualifiers of the embedded object are also applied to all other members or items contained within that embedded object. It should be noted that, as described in connection with other examples herein, although FIG. 12 references only a single embedded object (e.g., object2 as a member that has a type of class "name 2" at line 1120), a class definition for "name 1" may include multiple embedded objects at the same level as "object2". Also, the class definition for name2 may further include as members one or more other embedded objects. The classes (and instances or objects thereof), attributes, methods, embedded classes (and instances or objects thereof), and the like, may form a qualifier scoping hierarchy having a nesting of qualifier scoping levels. An embodiment in accordance with techniques herein may provide for any suitable number of nesting levels. It should be noted that the foregoing nesting of classes and objects and qualifier scoping levels described herein may be more generally applied to any attribute type such as, for example, a defined attribute type which may be analogous to a C++ language structure. With reference to FIG. 12, line 1120 references class "name 2" which, when an object of class "name 1" is instantiated, results in the object of class "name1" containing an embedded object of class "name 2". In an embodiment which allows embedded objects, name2 may refer to a previously defined class occurring prior to its reference or usage in line 1120.

In accordance with techniques herein, the qualifiers specified at a first level of the qualifier scoping hierarchy (e.g., line 1102) are also applied to any other lower levels of the qualifier scoping hierarchy nested within the foregoing first level. For example, the qualifiers at line 1102 are applied to an object 1 of class name1 and also to each of the members or items at lines 1108, 1112, 1116 and 1120 contained within object1. Additionally, with respect to those items contained within object1, the qualifiers from the first level are applied in combination with any other qualifiers specified for such individual items at the lower nested levels. For example, the qualifiers at line 1102 (first level) are applied in combination with the qualifiers at line 1106 (second level nested within the first level) to the attribute ATT1 of line 1108. The foregoing aggregate application of qualifiers may be repeated for each lower level of nesting contained within a higher level of nesting. For example, qualifiers from lines 1102 and 1118 are applied in combination to all members of the class "name2".

In one embodiment, the qualifiers, such as for a single occurrence of [QUALIFIERS] in FIGS. 11 and 12, may be specified as a list of one or more applicable roles and/or levels of expertise. In one embodiment, the qualifiers may generally be represented as a list of one or more roles:

(Role1, Role2, . . . )

and/or a list of one or more levels of expertise, (exp1, exp2, . . . )

When specifying both a list of roles and a list of expertise levels in connection with the qualifiers, an embodiment may evaluate the foregoing two lists logically as:

((Role1 OR Role2 OR . . . ) AND (Exp1 OR Exp2 OR . . . ))

and apply the qualifiers as appropriate for scoping in accordance with placement within the template and elements therein. In other words, the qualifiers are evaluated so as to logically OR any specified Roles, logically OR any specified levels of expertise, and then logically AND the results of the foregoing two. This as well as other aspects of the techniques herein are further illustrated in following paragraphs and examples.

The language of the template may reflect the qualifier scoping hierarchy of the classes of objects, associated methods and attributes, and associated qualifiers in accordance with defined classes. To further illustrate scoping of qualifiers, for example, reference is made back to FIG. 5 and it is assumed that objects 404 and 406 (respectively objects 3 and 4) are defined as embedded objects within object 1's class definition. In the further illustration below, object 1 is an instance of Class1, object 3 is an instance of Class 3 and object 4 is an instance of Class 4. The objects (including composite and embedded objects), methods and attributes may have a qualifier scoping hierarchical structure and associated qualifier scoping levels represented as:

```
Class 1            /*composite object1 of class1 - level 1 */
   Attribute 1        /* level 2 */
   Attribute 2        /* level 2 */
   :
   Method 1           /* level 2 */
   Method 2           /* level 2 */
   :
   Class 3            /*embedded class- level 2 - object 3 of class 3 */
      Attribute 1        /* level 3 */
      Attribute 2        /* level 3 */
      Attribute 3        /* level 3 */
      Attribute 4        /* level 3 */
      Attribute 5        /* level 3 */
      Method 1           /* level 3 */
      Method 2           /* level 3 */
      Method 3           /* level 3 */
      Method 4           /* level 3 */
      Method 5           /* level 3 */
   Class 4            /*embedded class level 2 - object 4 of class 4*/
      Attribute 1        /* level 3 */
```

-continued

| | |
|---|---|
| Attribute 2 | /* level 3 */ |
| Attribute 3 | /* level 3 */ |
| Attribute 4 | /* level 3 */ |
| Attribute 5 | /* level 3 */ |
| Method 1 | /* level 3 */ |
| Method 2 | /* level 3 */ |
| Method 3 | /* level 3 */ |
| Method 4 | /* level 3 */ |
| Method 5 | /* level 3 */ | where each qualifier scoping level is represented by a different level of indentation. In the foregoing above example, object 1 of class 1 is at a first or highest level in the qualifier scoping hierarchy and level 3 is the lowest hierarchical level (e.g., such as associated with members of classes 3 and 4 and, respectively, objects 3 and 4). Qualifiers specified for a first element at first qualifier scoping level are applied generally to the first element and any other elements contained or nested within the scope of that first element. All such other elements are included within the scope of the first element and have an associated qualifier scoping level which is located at a lower level within the qualifier scoping hierarchy (e.g., having a level number greater than the first element).

Qualifiers specified at level 1 in the qualifier scoping hierarchy for object1 of class 1 may be, for example, "(Role 1, Role 2) (Exp1, Exp2)" evaluated as "(Role 1 OR Role 2) AND (Exp1 OR Exp2)" meaning that a user having Role 1 or Role 2 and also having Exp1 or Exp2 is allowed access to all elements of, or embedded within, object 1. If other qualifiers are also specified for an element at a lower level in the hierarchy (e.g. as denoted in the foregoing by having a higher hierarchical level number such as at level 2 or level 3) nested within an upper hierarchical level, then such other qualifiers are evaluated in combination with any other applicable qualifiers from the upper hierarchical level. In one embodiment, qualifiers specified at a lower hierarchical level nested within a first hierarchical level may be characterized as expanding the list of roles and levels of expertise of the first hierarchical level. In connection with evaluation, such qualifiers specified at lower levels nested within an upper (or containing) hierarchical level may be added to the list of roles and expertise specified for the upper hierarchical level. For example, with reference to the above example, suppose the following are specified as qualifiers for class 4 (embedded object 4 of object 1):

(Role 3) (Exp3)

in addition to specifying the following qualifiers for class 1 (e.g., object1 of class1):

(Role 1, Role 2) (Exp1, Exp2)

The qualifiers for Class 4 (e.g., Object4) are evaluated in combination with the qualifiers for Class 1 (e.g., object1) as:

(Role 1 OR Role2 OR Role3) AND (Exp1 OR Exp2 OR Exp3)

so that a user having any of the foregoing roles and any of the foregoing levels of expertise is allowed to access all elements (e.g., perform all methods, access all attributes, embedded objects, etc.) of Class 4 (e.g., object4).

The foregoing list of qualifiers (e.g. list of roles and expertise levels having members logically OR'd in connection with Class 4 and object4) may be further expanded to include any other roles and/or expertise levels specified for embedded items at subsequently lower levels nested within Class 4. For example, suppose that in addition to the above qualifiers for Class 1 (at Level 1) and Class 4 (at level 2), the following expertise level is specified as a qualifier for method1 of Class 4 (at level 3):

(Exp5)

The qualifiers for method1 are evaluated as:

(Role 1 OR Role2 OR Role3) AND (Exp1 OR Exp2 OR Exp3 OR Exp5)

so that a user having any of the foregoing roles and any of the foregoing levels of expertise is allowed to perform method1.

It should be noted that in connection with embedded classes of composite classes, an embodiment may provide for variations in evaluating qualifiers than as described above. For example, an embodiment may provide for a different logical evaluation in connection with aggregating or combining qualifiers of different levels.

Figure 13:
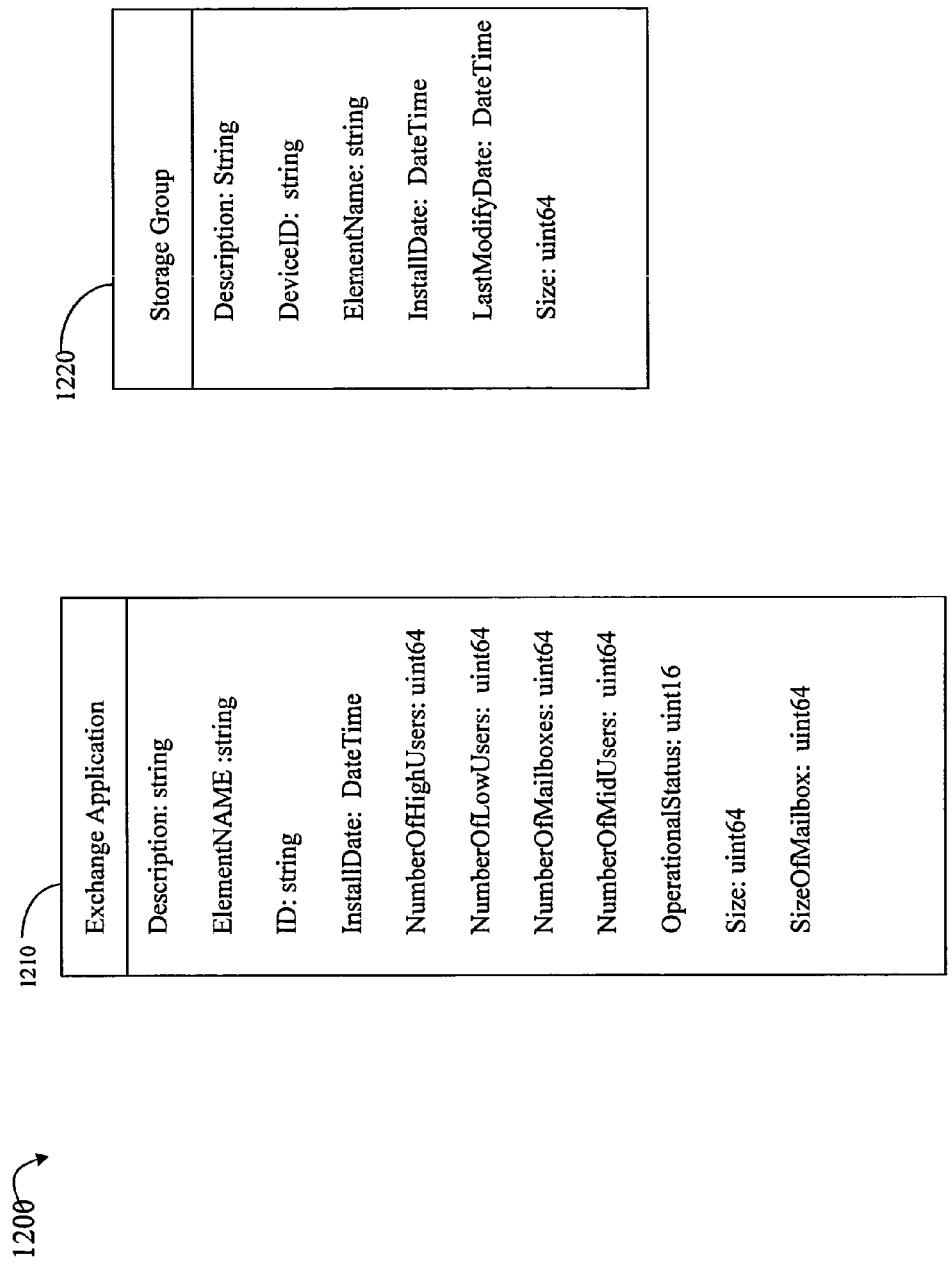
FIG. 13 is an example of class definitions that may be used in an embodiment in accordance with techniques herein.

To further illustrate use of the techniques herein in connection with data storage management operations, such as for storage provisioning for a particular application, reference is made to FIG. 13.

Referring to FIG. 13, shown is an example 1200 of class definitions that may be used in an embodiment in accordance with techniques herein. In the example 1200, two class definitions are provided for an email application, Exchange application 1210 (e.g., for the Microsoft Exchange™ electronic mail application), and for a storage group 1220. A storage group may generally refer to a grouping of one or more devices of a data storage system. For example, the email application represented by an object of class 1210 may have storage provisioned on one or more device of the data storage system. The one or more devices used by the email application for storage may be included in a storage group represented by an object of class 1220. Depending on the role and/or expertise of the user, the information accessible to the user and allowable operations in connection with data storage management for the email application may vary. Thus, the techniques herein may be used to provide an object model for the user in accordance with the user's role and/expertise for data storage management as specified with qualifiers.

Each of the class definitions 1210, 1220 includes multiple elements or items having a general format of:

NAME:TYPE wherein NAME specifies a name for the item or element and TYPE specifies a defined data type for the item or element. Types may include any one or more data types such as, for example, string, uint16 (unsigned 16 bit integer), uint64 (unsigned 64 bit integer), DateTime (string or alphanumeric format of date and time), another class, and the like.

For this example, we have three user roles of "administrator", "manager", and "monitor" and three level levels of expertise—"expert", "generalist" and "novice"—as described above in connection with other examples.

The example 1200 provides exemplary class definitions for objects as may be included in an embodiment for performing data storage management operations, such as storage provisioning, for an application corresponding to a class definition for 1210.

In accordance with techniques herein, varying portions of objects of each of the two classes of FIG. 13 may be accessible to a user in accordance with the role and/or expertise level associated with the user. What will now be described are examples illustrating how an embodiment may implement techniques described herein to specify, in accordance with role and/or level of expertise, which portions of the objects are accessible to the user and thus included in the object model for the user.

Referring to FIG. 14 shown is an example of information that may be included in a template specifying qualifiers for the class ExchangeApplication that is derived from another class (e.g., super class or parent class) EMC_ExchangeApplication. The example 1300 includes information of a template that may be used in connection with specifying qualifiers for the class 1210 of FIG. 13. In the example 1300, particular language syntax is specified so that the list of role(s) is specified using the keyword EMC_Roles and the list of expertise level(s) is specified using the keyword EMC_UserLevel. For example, lines 1302 and 1304 specify the qualifiers for the class ExchangeApplication and indicate that a user having a role of administrator, manager or monitor, and also having an expert level of sophistication may access any member or item within the class ExchangeApplication of 1300. The administrator role also has write access to all elements which are writable or modifiable, such as via a method call to modify one or more attributes. As described below, this example 1300 does not specify any methods such as may be used in connection with other classes. Line 1310 specifies qualifiers for the Size attribute (line 1312) expanding access of this attribute to users having an expertise of novice or generalist. Line 1316 specifies qualifiers for the ID attribute (line 1318) expanding access of this attribute to a user having an expertise level of novice or generalist. Lines 1322 specifies qualifiers for the NumberOfMailboxes attribute (line 1324) expanding access of this attribute to a user having an expertise level of generalist. Line 1328 specifies qualifiers for the SizeOfMailbox attribute (line 1330) expanding access of this attribute to a user having an expertise level of generalist. Line 1346 specifies qualifiers for the Description attribute (line 1348) expanding access of this attribute to a user having an expertise level of novice or generalist. Line 1352 specifies qualifiers for the ElementName attribute (line 1354) expanding access of this attribute to a user having an expertise level of novice or generalist. Other attributes of the example 1300 which do not have additional qualifiers are restricted to users having roles and expertise levels as indicated in lines 1302 and 1304.

In accordance with techniques herein, specifying the qualifiers at the class or outermost level in lines 1302 and 1304 has the same effect as specifying the qualifiers of lines 1302 and 1304 for each item or member embedded within the class (e.g., for each attribute of an object of the class where each attribute is included as a member in the class definition 1210). More generally, the qualifiers specified at a first level of the qualifier scoping hierarchy (e.g., lines 1302, 1304) are applied in combination with any other qualifiers of other lower levels (e.g., line 1310) of the qualifier scoping hierarchy nested within the foregoing first level.

Figure 15:
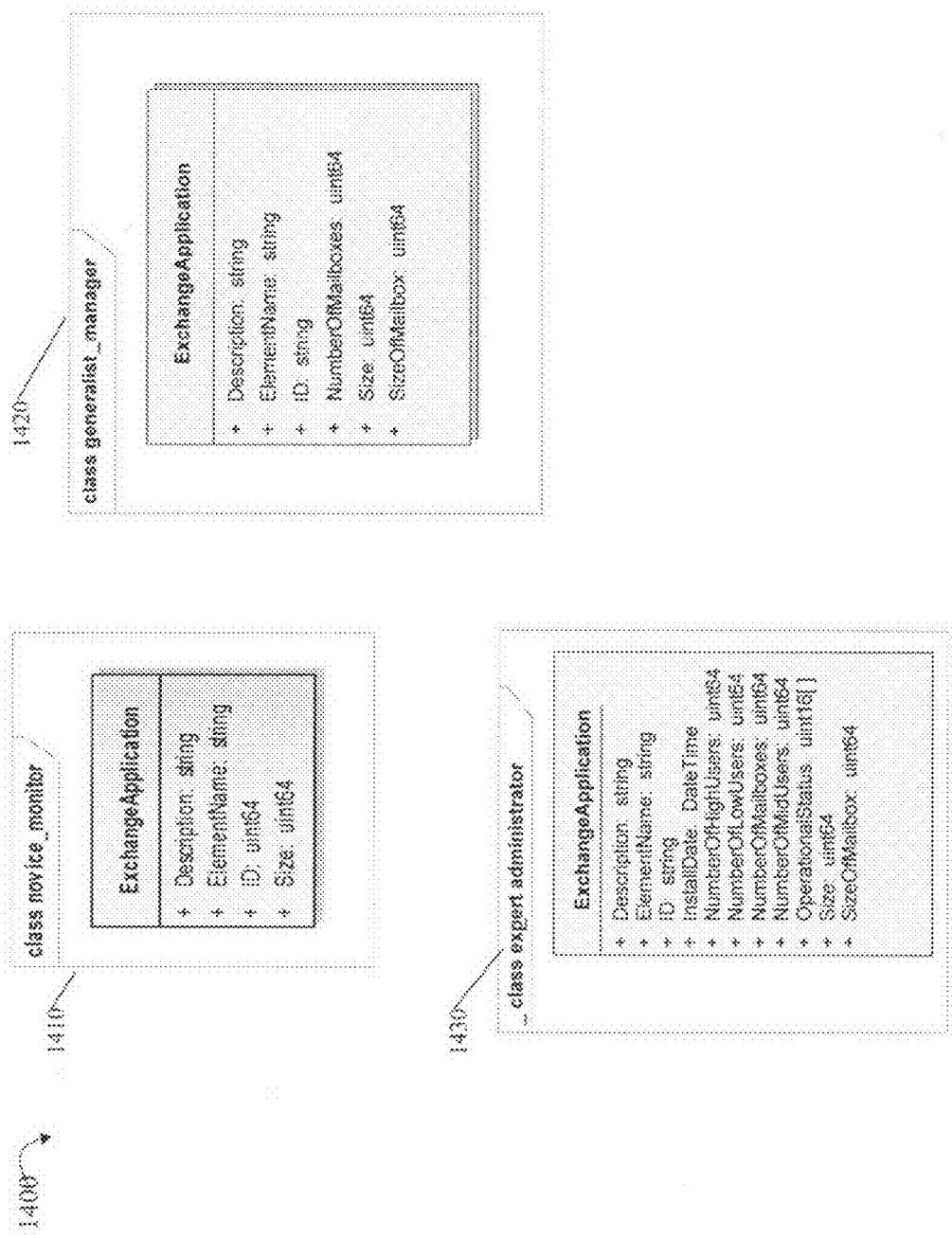
FIGS. 15, 17, 19, 20, 20A and 20B are examples illustrating variations in object models based on user role and expertise using a template in accordance with techniques herein.

In accordance with the template description of FIG. 14, reference is now made to the example 1400 of FIG. 15.

Referring to FIG. 15, shown is an example representation of the object models for the Exchange Application class for different users having particular combinations of role and level of expertise. Element 1410 represents an object model for an object of the class "ExchangeApplication" as illustrated in FIG. 14 for a user having a novice expertise level and a role of monitor. Element 1410 may represent those attributes of the object instance of class ExchangeApplication which are accessible such as for viewing/reading by the novice monitor. Element 1420 represents an object model for a user having a generalist expertise level and a role of manager. Element 1420 may represent those attributes of the object or instance of class ExchangeApplication which are accessible such as for viewing/reading by the generalist manager. Element 1430 represents an object model for a user having an administrator role and an expert level of expertise level. Additionally, the user as an administrator has write access to all elements of the object instance. Element 1430 may represent those attributes of the object instance of class ExchangeApplication which are accessible such as for viewing/reading and also for writing by the expert administrator.

Based on the foregoing example 1400, as the level of expertise increases, the number of attributes accessible to the user may also increase.

Referring to FIG. 16, shown is an example of information that may be included in a template specifying qualifiers for the class StorageGroup. The example 1500 includes information of a template that may be used in connection with specifying qualifiers for the class 1220 of FIG. 13 (e.g. all objects of class 1220). Lines 1502 and 1504 specify the qualifiers for the class StorageGroup and indicate that a user having a role of administrator or manager, and also having an expert or generalist level of expertise may access any item or member within an object of the class StorageGroup of 1500. No additional qualifiers in the example 1500 are specified at the lower nested qualifier levels such as in connection with individual attributes of the class. It should be noted that EMC_ExchangeStorageGroup may represent a superclass or parent class as described in connection with the class EMC_ExchangeApplication of FIG. 14.

In accordance with techniques herein, specifying the qualifiers at the class or outermost level in lines 1502 and 1504 has the same effect as specifying the qualifiers of lines 1502 and 1504 for each item or member contained within the class (e.g., for each attribute of an object of the class where each attribute is included as a member in the class definition 1220). More generally, the qualifiers specified at a first level of the qualifier scoping hierarchy (e.g., lines 1502, 1504) are applied to other lower levels of the qualifier scoping hierarchy nested within the foregoing first level.

Figure 17:
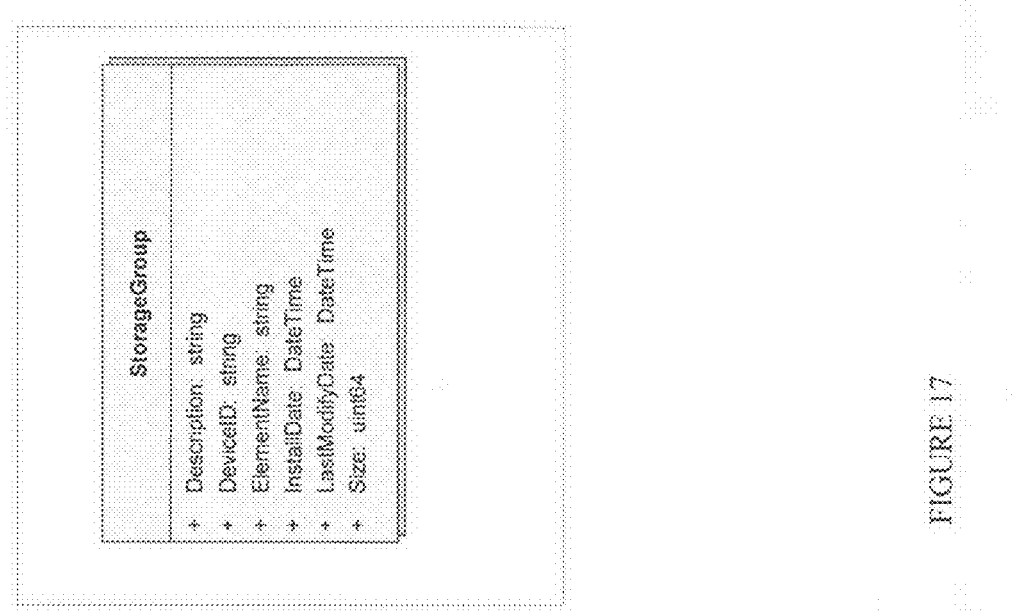

In accordance with the template portion of FIG. 16, reference is made to the example 1600 of FIG. 17.

Referring to FIG. 17, shown is an example representation of the object model for the StorageGroup class. The example 1600 represents an object model for an object of the class StorageGroup (e.g., from FIG. 16) for a user who is an expert or generalist, and also has a role of administrator or manager. The example 1600 may represent those attributes of the object of class StorageGroup which are accessible such as for viewing/reading by a user having an appropriate role and expertise level in accordance with the object level qualifiers of lines 1502 and 1504 of FIG. 16. It is noted that a user having a novice expertise level, such as the novice monitor described in connection with element 1410 of FIG. 15, cannot access or otherwise view the storage group object (or any portion thereof) of the example 1600.

An embodiment in accordance with techniques herein may also provide for specifying qualifiers at the argument or parameter level for methods. Referring back to FIG. 12, lines 1114 and 1116 may represent an example of specifying qualifiers for a method. In the example 1100 at lines 1114 and 1116, the qualifiers of 1114 may be applied to all parameters of method1. An embodiment may also provide for parameter level specification of qualifiers such as may be represented by the general format of:

Method (parameter1, QUALIFIERS)
(parameter2, QUALIFIERS) . . .

where "Method" represents the method name,
    "parameter1" represents the first method parameter followed by optional QUALIFIERS,
    "parameter2" represents the second method parameter followed by optional QUALIFIERS, and so on, for each parameter of the represented method.

It should be noted that a method may also have no parameters. QUALIFIERS may be any one or more roles and/or expertise levels as described above for use with classes of objects, attributes, and the like. The parameter level qualifiers may be evaluated in a manner as generally described herein where the method parameters form another level in the qualifier scoping hierarchy of the template. An embodiment may use qualifiers for a method parameter to restrict a range of possible values allowable for different roles and/or levels of expertise. For example, a method may have 5 parameters. For an expert level, parameter1 may be specified as any one of 4 possible values. For all other levels of expertise, parameter1 may be limited to a particular single value. An embodiment may also provide additional syntax for specifying the allowable value(s) for different roles and/or levels of expertise for each parameter.

Qualifiers for method parameters may also be used to allow a varying number of parameters for different levels of expertise and/or roles. For example, for a novice, no parameter values may be specified on method invocation. However, for an intermediate or generalist, values may be specified for two parameters. For an expert, values may be specified for four parameter. An embodiment may also provide additional syntax for specifying which roles and/or levels of expertise may provide values for each parameter.

An embodiment may include the foregoing method parameter level qualifiers in addition to method level qualifiers as described above and illustrated, for example, in FIGS. 11 and 12. Alternatively, rather than provide for qualifiers at both the method level and method parameter level, an embodiment may include only one of the foregoing.

Described in paragraphs above is one type of association between a first object, a composite object of a composite class, and a second raw or basic object, which is an embedded object of the first object where the embedded object has a type which is a class. The template and language used in an embodiment in accordance with techniques herein may also provide for representing additional relationships or associations, such as between objects, classes, and the like. Described in following paragraphs and figures is an exemplary additional association that may be included in an embodiment in accordance with techniques herein.

Referring to FIG. 18, shown is an example of a portion of a template that may be used to describe an association or relationship in an embodiment in connection with techniques herein. The example 1700 may be included in a single template with the description language portions from FIGS. 14 and 16. As noted above, FIG. 14 specifies qualifiers for a first class, ExchangeApplication. FIG. 16 specifies qualifiers for a second class, StorageGroup. A second object of the second class may represent a storage group from which storage is provisioned for use by the email application represented by a first object of the first class. The example 1700 may be used to specify the foregoing association or relationship between the first and second objects. In a manner similar to that as described in connection with FIGS. 14 and 16, lines 1702 and 1704 specify the qualifiers (e.g., as a list of roles at 1702 and a list of expertise levels at line 1704) for this association. In this example, associations are implemented using classes where there are two or more attributes of type class that reference instances of the classes. The association has a name, "Component", corresponding to the class at line 1706. The class "EMC Component" is the parent class of the particular association between the objects identified in lines 1712 and 1714. An embodiment may also define other classes for different corresponding named associations. Line 1712 identifies a first member "GroupComponent" which is an address of, or more generally, a reference (REF) to, an object of class ExchangeApplication. Line 1714 identifies a second member "Part Component" which is an address of, or more generally, a reference (REF) to, an object of class StorageGroup. Although not illustrated herein for an object of class Component 1700, the members of thereof may then be assigned values to represent the foregoing association or relationship. In particular, the first member (line 1712) of the object may be assigned the address of the first object (e.g., an instance of the class ExchangeApplication). Similarly, the second member (line 1714) of the object may be assigned the address of the second object (e.g., an instance of the class StorageGroup).

The qualifiers of lines 1702 and 1704 indicate that this association is included in an object model for a user having a role of administrator, monitor or manager, and also having an expertise level of generalist or expert. Based on these qualifiers, the association between the first object of class ExchangeApplication and second object of class StorageGroup is included in the object model for the generalist manager and expert administrator. However, as with the class StorageGroup described in FIG. 17, the association specified by the class_Component is not visible to, or included in the object model for, a novice monitor.

Figure 19:
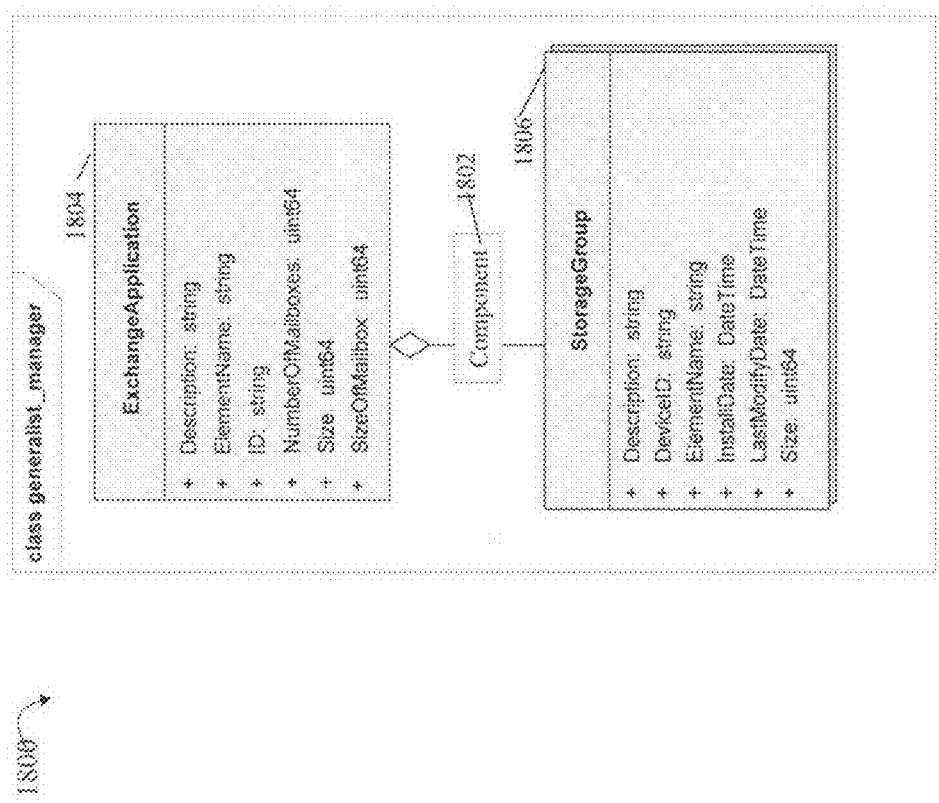
Figure 20:
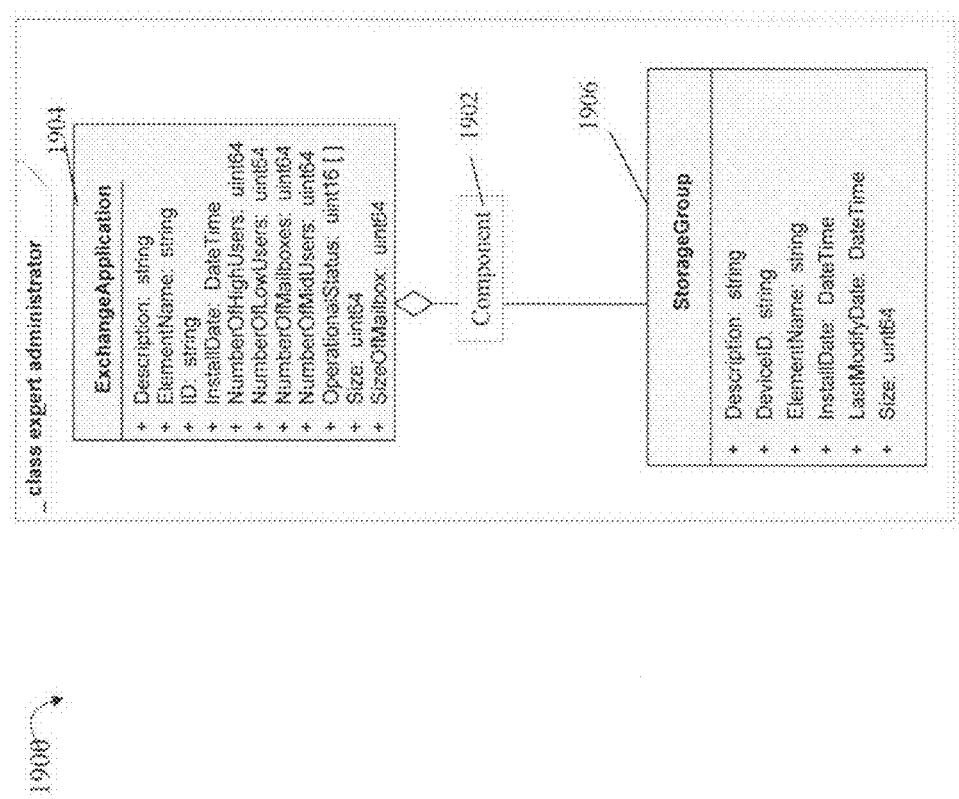

In an embodiment having the classes of objects and qualifiers as described in connection with FIGS. 14-18 above, the object model for the generalist manager may be as illustrated in FIG. 19 and the object model for the expert administrator may be as illustrated in FIG. 20. The object model for the novice monitor includes only those portions of the class as illustrated by 1410 of FIG. 14. In FIG. 19, the association described above in FIG. 18 is illustrated as element 1802 and the connection between classes represented by 1804 and 1806. In FIG. 20, the association described above in FIG. 18 is illustrated as element 1902 and the connection between classes represented by 1904 and 1906.

Figure 20A:
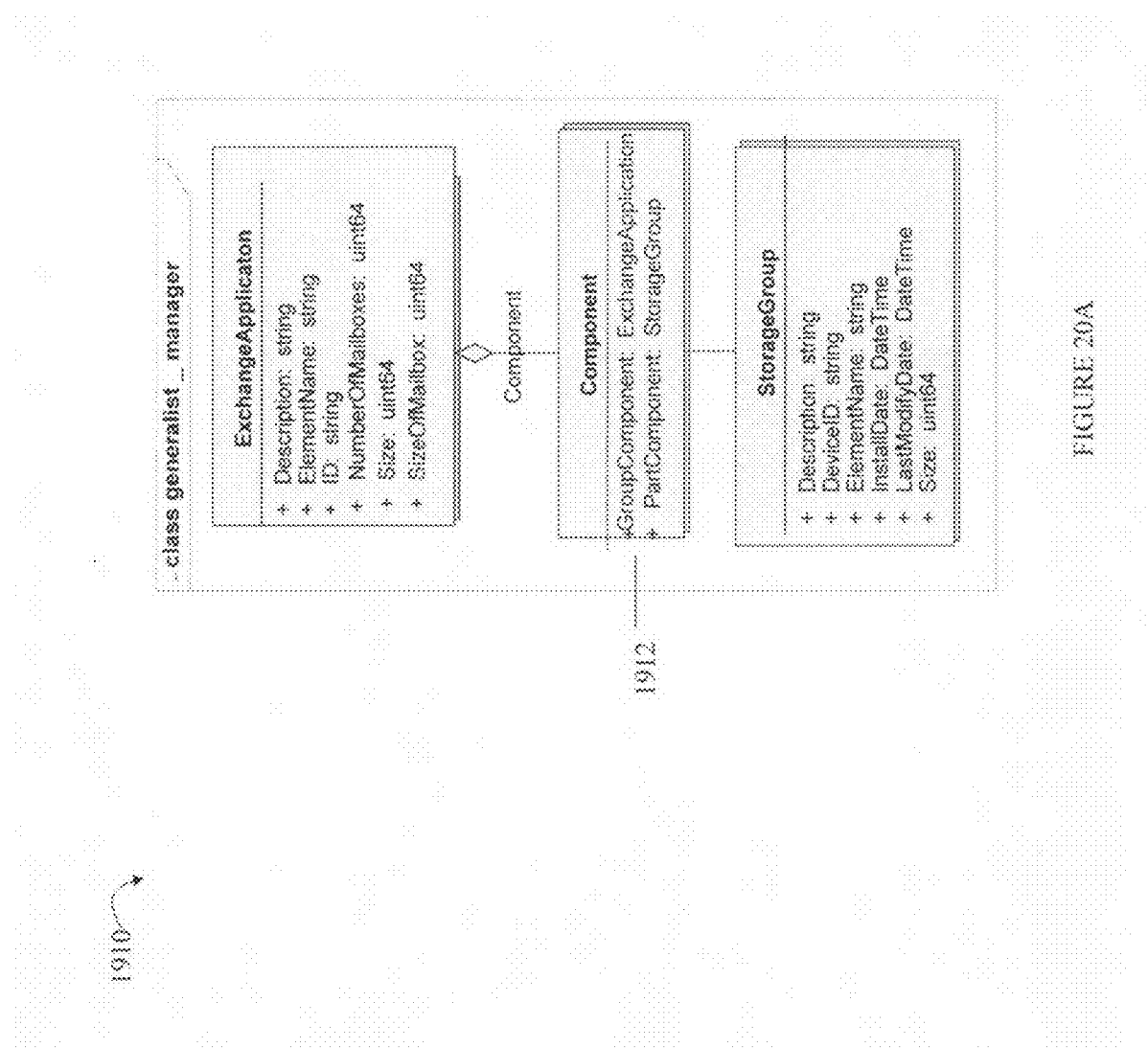
Figure 20B:
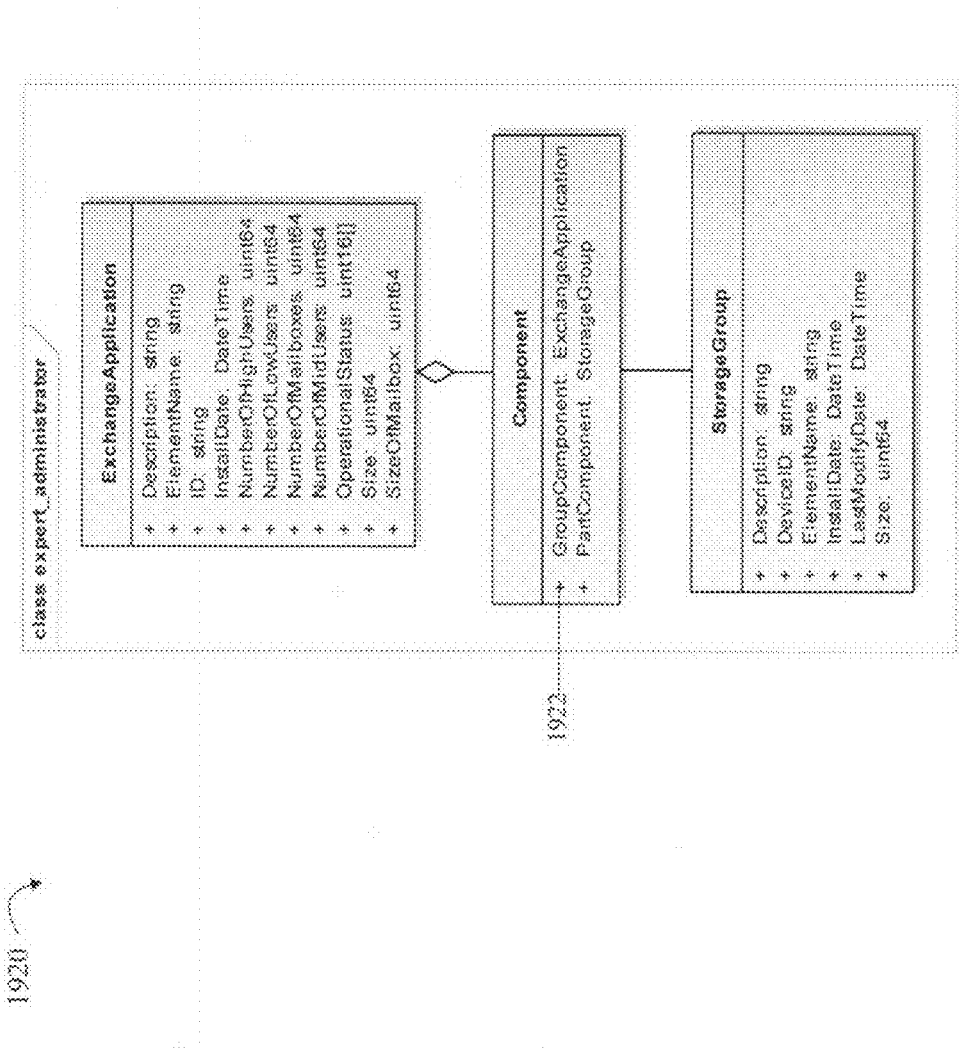

FIGS. 20A and 20B illustrate an alternative way in which an embodiment may represent an association as a class. FIG. 20A is an alternate representation of the example of FIG. 18 where the association may be represented using element 1912. FIG. 20B is an alternate representation of the example of FIG. 19 where the associate may be represented using element 1922. It should be noted that the object model as just described in connection with the forgoing examples with qualifiers as applied to a class definition may also be more generally referred to as a class model for objects which are instances of the particular classes. For example with reference to FIG. 19, the element 1804 may represent a view, or allowed access, with respect to all objects of the class ExchangeApplication for a generalist manager and element 1806 may similarly represent a view, or allowed access, with respect to all objects of the class StorageGroup.

Figure 21:
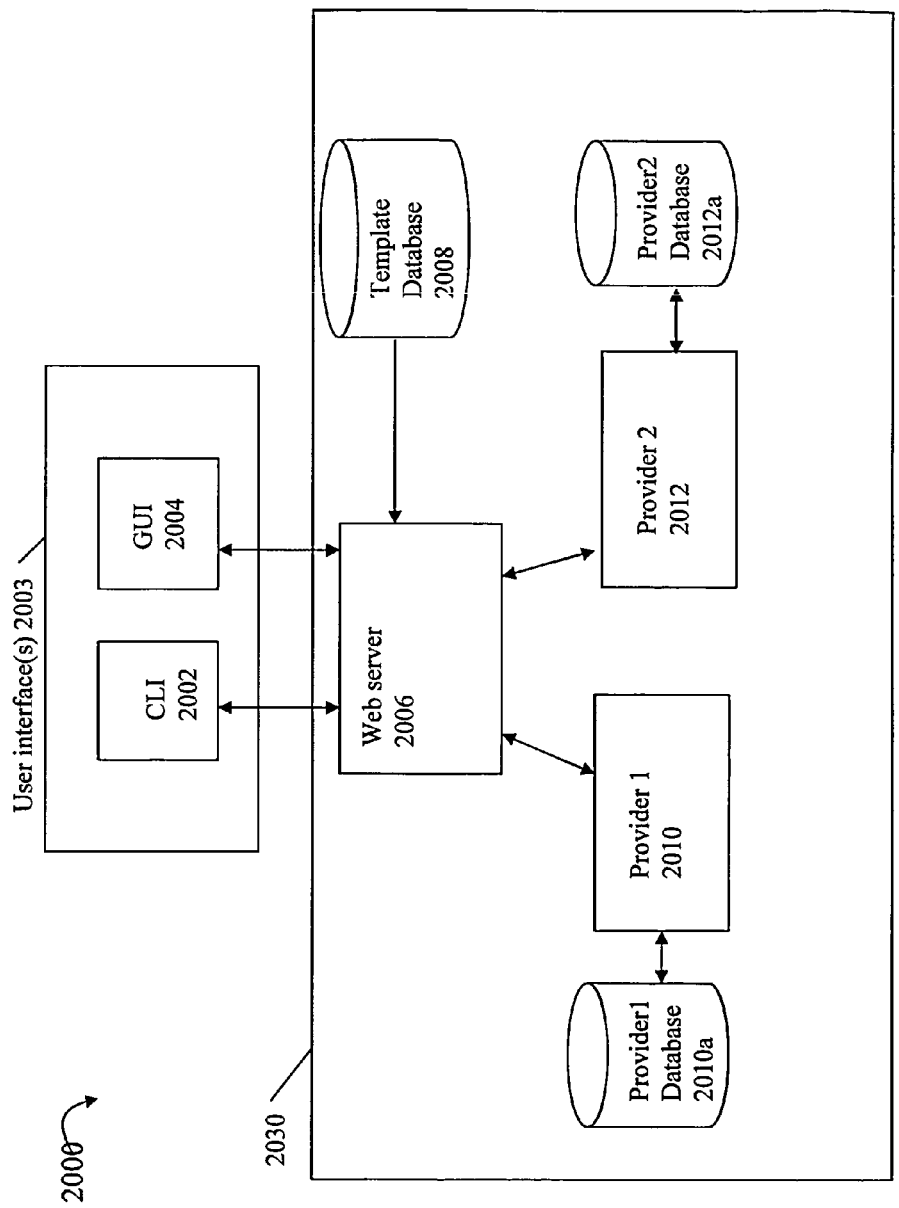
FIG. 21 is an example illustrating components that may be included in an embodiment in accordance with techniques herein.

Referring to FIG. 21, shown is an example of various components that may be used in an embodiment of a system in accordance with techniques herein utilizing templates having an object description annotated with qualifiers as described above. The example 2000 includes one or more types of user interfaces 2003 (such as a CLI (command line interface) 2002 and a graphical user interface (GUI) 2004), a web server 2006, a template database 2008, one or more providers 2010, 2012, and one or more provider databases 2010a, 2012a. One or more of the user interfaces 2003 may reside on a client, such as a client computer. The other components of FIG. 21 may be included in one or more server computers or systems 2030.

Each of the providers 2010, 2012 may provide objects for a particular service or application. For example, provider 2010 may be an email application provider. The database 2010a may include objects defined in accordance with the templates herein identifying which portions of the objects describing email application management data, methods, and the like, are accessible to a user in accordance with qualifiers of the template. By limiting or restricting access to portions of an object of 2010*a* in accordance with roles and/or levels or expertise specified by qualifiers, a user may be presented with a customized object model for data management of the email application in accordance with a role and/or expertise assigned to the user. The customized object model may limit or restrict access to particular data values related to data storage management for the email application, may limit or restrict ability to perform particular operations (e.g., methods for viewing, modifying, deleting, creating, etc. particular data values in connection with data storage management), and the like. The template database 2008 may include templates as described, for example, in FIGS. 14, 16 and 18. The provider database 2010*a* may include the objects or class instances (e.g., initialized with appropriate data values), for example, for the particular class and associated qualifiers described by FIG. 14.

To illustrate processing that may be performed by the components of FIG. 21, reference will be made in following paragraphs to an example using the GUI 2004. A user may logon using the GUI 2004 to perform a data storage management operation, such as provision storage for an email application corresponding to the object of a class as described above, for example, in connection with FIG. 15. The user may provide information, such as a user name and password, using the GUI 2004 which is communicated to the web server 2006 for authentication.

A role and level of expertise, such as generalist manager, may be assigned to the user. After login, the GUI 2004 may request information for display on an interface for the "generalist manager" user. For example, the user wants to provision storage for the email application and the GUI may request information to be displayed to the user in connection with performing this provisioning operation. For a "generalist manager", one set of information may be displayed in accordance with the object model of FIG. 19. As an alternative, if the user was an "expert administrator", a second set of information may be displayed in accordance with the object model of FIG. 20. In this example, the user logged on is a generalist manager and the GUI may display current information for the email application as indicated by 1804 of FIG. 19. What will now be described are different ways in which processing may be partitioned among the components of FIG. 21.

As a first example in connection with displaying the information, the GUI 2004 may issue a first request to the web server 2006 for template information describing the class ExchangeApplication and associated qualifiers (e.g., information of FIG. 14). The web server 2006 may retrieve the template information from the template database 2008 and return the requested template information to the GUI 2004. The GUI 2004 may then issue a subsequent request to the web server 2006 for the object which is of the class ExchangeApplication. In this subsequent request, the GUI 2004 is requesting the instance of the class or data values of the object's members. The web server 2006 may communicate with the appropriate provider, such as provider 1 2010, which retrieves the object from the database 2010*a*, and returns the object to the web server 2006. Subsequently, the web server 2006 returns the object data to the GUI 2004 to populate a user interface with current data values of the object. In this first example, the web server 2006 may return all information of the object instance to the GUI 2004 in response to the subsequent request. The GUI 2004 may then use the template information returned in response to the first request to filter the object data and display an appropriate user interface populated with such filtered object data based on the role and/or expertise level for the user. For example, for the generalist manager, the GUI may display object data based on the object model of FIG. 19. The GUI may also, for example, display menu options to perform certain operations or methods that may vary with the role and/or expertise level of the user. In connection with the foregoing, the GUI or other user interface may perform all processing or filtering of object data in accordance with the template. The web server 2006 and other server-side components may not perform any such processing or filtering in accordance with the template. The GUI may perform processing to ensure that, in accordance with qualifiers of the template, only selected information is displayed to a user, only selected information is received from a user and returned to the web server 2006, and that a user is only allowed to perform selected operations in accordance with the template. In this first example, the web server 2006 may not perform any checking, for example, as to whether a requested operation is allowable for a particular user. All such filtering may performed by the GUI or other user interface on the client side.

As a variation to the foregoing first example, the GUI or other user interface may perform filtering in accordance with the template as described above. Additionally, the web server 2006 may perform processing for particular operations requested by the GUI or other interface. For example, the web server 2006 may perform processing to verify that a user has an appropriate role and/or expertise level (as specified in the template) to perform one or more particular methods or requested operations. To further illustrate, the web server 2006 may perform such processing to verify that a user has an appropriate role and/or expertise level for operations or methods which provision storage for the email application, modify a current data storage configuration for the email application, or and the like.

As a further variation to the foregoing, the web server may perform processing to filter information returned to the GUI or other user interface in accordance with the template. For example, when a GUI requests object data, the web server may return only selected portions of the object data in accordance with the template. In this case, such as for a generalist manager, the web server may only return those portions of the object data designated as allowable or accessible for the generalist manager by the qualifiers in the template (e.g., return only that information allowable in accordance with FIG. 19 representation of the object model for the generalist manager as specified using the template qualifiers). The filtering of the object data or instance in accordance with the template may be performed by the appropriate provider or by the web server. As another example, when the GUI requests the template, the web server may only return those portions (including only selected portions of the class definition) designated as accessible by the qualifiers based on the user's role and/or expertise. Thus, the web server may perform filtering of the template and/or object data returned to the GUI.

In connection with the foregoing, the template in accordance with techniques herein may be used to provide different object models for a user in accordance with a level of expertise and/or role associated with the user. The object model may be used to vary or otherwise restrict information available to the user, and vary or otherwise restrict operations the user can perform on the information. The object model may be used in connection with information and operations displayed to the user. For example, if the object model for a user having a particular role and expertise level specifies that only a portion of the object data is viewable or accessible to the user, only information included in that portion of the object data may be displayed to the user Similarly, if the object model specific that the user is allowed to perform a first operation or method but not a second operation or method, the user interface may be populated with appropriate information and options for the first operation or method but not the second operation or method.

An embodiment may use the Common Information Model (CIM) in connection with implementing the techniques herein. In such an embodiment, defined interface calls, such as GetInstance and GetClass, may be used in implementing the protocol between the web server and GUI (or other user interface) as described above. For example, GetInstance may be used by the GUI when requesting the object instance from the web server (which then communicates with the appropriate provider), and GetClass may be used by the GUI when requesting the template information from the web server. The template information may include class definitions as annotated herein with qualifiers such as illustrated, for example, in FIGS. 14, 16 and 18.

It should be noted that the examples provided, for example, in connection with FIGS. 11-20B illustrate use of qualifiers as applied to a defined class. Therefore, the qualifiers for specifying roles and expertise may be applied to all objects of the defined class. An embodiment may also provide a finer granularity of control for specifying application of the qualifiers. An embodiment may also provide for specifying particular objects or individual class instances to which the qualifiers are applicable. In other words, an embodiment may provide for specifying a first set of qualifiers and roles for a first set of objects of a first class and also specifying a second set of different qualifiers and roles for a second different set of objects of the first class. In such an embodiment, the foregoing may be specified using any one of a variety of different syntaxes. For example, with reference back to FIG. 11, an embodiment may provide for object-level qualifier specification by including in the template a list of one or more objects at line 1004 (e.g., "CLASS: Object-list" where "CLASS" identifies a defined class and "Object-list" identifies a list of one or more objects of type CLASS to which the qualifiers at line 1002 are applied). An embodiment may also provide for object-level qualifier specification by including a list of one or more objects in a separate line prior to line 1004 (e.g., between 1002 and 1004 in a template). Qualifiers applicable to a class definition or all objects of a class may also be referred to as class level qualifiers. Qualifiers applicable to only identified class instances or objects may also be referred to as object level qualifiers. An embodiment may provide for using any one, or both, of the class level qualifier and the object level qualifier.

An embodiment may implement the techniques herein using code executed by a processor. For example, an embodiment may implement the techniques herein using code which is executed by a processor of the data storage system. As will be appreciated by those skilled in the art, the code may be stored on the data storage system on a computer-readable storage medium having any one of a variety of different forms including volatile and nonvolatile, removable and non-removable media implemented in any method or technology for storage of information such as computer readable instructions, data structures, program modules or other data. Computer-readable storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for providing views of an object model comprising:
    receiving a template specifying allowable access for a first object using qualifiers for the first object, said qualifiers including a first list of one or more roles and a second list including a plurality of levels of expertise, wherein each of the plurality of levels of expertise denote a different level of expertise for each of the one or more roles in the first list, each of the plurality of levels of expertise denoting a different level of skill and a different level of knowledge, a first of the plurality of levels of expertise denoting a higher level of knowledge and skill than a second of the plurality of levels of expertise;
    determining, for a user identifier having an associated role and an associated level of expertise, whether to allow access to said first object, said determining including determining whether said associated role is included in said first list and whether said associated level of expertise is included in said second list; and
    allowing access to said first object if said associated role is included in the first list and said associated level of expertise is included in the second list, wherein a first user identifier is associated with a first role of the first list and the first level of expertise and a second user identifier is associated with the first role and the second level of expertise, and wherein the first user identifier is allowed to perform at least one operation that said second user identifier is not allowed to perform whereby, to perform the at least one operation requires greater skill and knowledge than denoted by the second level of expertise, and
    wherein the template identifies a first method for the first object, said first method including a first parameter with one or more first parameter-level qualifiers applying only to the first parameter and indicating that a user identifier associated with the first role and first level of expertise is allowed to specify a value for the first parameter and a user identifier associated with the first role and the second level of expertise is not allowed to specify a value for the first parameter thereby allowing the first user identifier to specify a value for the first parameter and not allowing the second user to specify a value for the first parameter.

2. The method of claim 1, wherein said first object includes one or more members and said template includes a description for each of said one or more members and indicates that each of said one or more members is included in said first object.

3. The method of claim 2, wherein at least one of the members of the first object is an attribute.

4. The method of claim 2, wherein at least one of the members of the first object is the first method corresponding to an operation performed in connection with the first object.

5. The method of claim 2, wherein at least one of the members of the first object is a second object.

6. The method of claim 2, wherein said qualifiers for the first object are first qualifiers and the template specifies second qualifiers for a first of the members of the first object, said second qualifiers including a third list of one or more roles and a fourth list of one or more levels of expertise.

7. The method of claim 6, further comprising:
determining, for the user identifier having the associated role and the associated level of expertise, whether to allow access to said first member, said determining whether to allow access to the first member including determining whether said associated role is included in said first list, whether said associated role is included in said third list, whether said associated level of expertise is included in said second list, and whether said associated level of expertise is included in said fourth list; and allowing access to said first member if said associated role is included in at least one of the first list and the third list, and if said associated level of expertise is included in at least one of the second list and the fourth list.

8. The method of claim 6, wherein the first qualifiers of the first object are applied to each of the members of the first object when determining whether to allow access to said each member.

9. The method of claim 6, wherein, when determining whether to allow access to said first member, the first qualifiers are evaluated in combination with said second qualifiers.

10. The method of claim 4, wherein said qualifiers for the first object are first qualifiers and the template specifies second qualifiers for the first method, said second qualifiers including a third list of one or more roles and a fourth list of one or more levels of expertise, and wherein said first method includes one or more parameters including the first parameter and said template specifies the first parameter-level qualifiers as parameter-level qualifiers for the first parameter.

11. The method of claim 10, further including performing first processing to determine whether a first value provided as said first parameter by a user having the user identifier is allowable, said first processing including evaluating, in combination, said first qualifiers, said second qualifiers and said parameter-level qualifiers.

12. The method of claim 1, wherein said qualifiers of said first object are first qualifiers, and wherein said template specifies allowable access for a second object using second qualifiers for the second object, said second qualifiers including a third list of one or more roles and a fourth list of one or more levels of expertise, said template specifying an association between said first object and said second object and third qualifiers for the association specifying allowable access for the association.

13. The method of claim 1, further comprising:
determining, using said template, information displayed on a user interface in accordance with said user identifier, wherein said information displayed varies with which of a plurality of roles and which of a plurality of levels of expertise are associated with said user identifier.

14. The method of claim 1, wherein said first object is an instance of a first class and the qualifiers for the first object are specified using at least one of a class level qualifier for a class definition of the first class and an object level qualifier applicable to one or more objects of said first class identified in said template, said first object being one of said one or more objects, said class level qualifier being applicable to all objects of the first class.

15. The method of claim 12, wherein, when said user identifier is associated with said first role and said second level of expertise, a user using said user identifier has access to said first object and does not have access to said association and does not have access to said second object, and when said user identifier is associated with said first role and said first level of expertise, a user using said user identifier has access to said first object, said second object, and said association.

16. The method of claim 12, wherein, when said user identifier is associated with said first role and said second level of expertise, a user using said user identifier does not have access to all members of said first object, and when said user identifier is associated with said first role and said first level of expertise, a user using said user identifier has access to all members of said first object.

17. The method of claim 12, wherein said template identifies allowable operations that can be performed for data storage administration, said first object and said second object being included in a plurality of objects described by said template, said first object representing an application, said second object representing a data storage area used by said application for storing data, said second object having at least a first method thereof identifying an administrative task performed for the data storage area, said template indicating, using said second qualifiers and using other qualifiers included in the template for the first method, that the user identifier has access to the first method and is allowed to perform the administrative task for the data storage area.

18. The method of claim 1, wherein said first list of one or more roles specifies one or more data storage administrative roles and said second list specifies one or more knowledge levels of data storage administration.

19. A non-transitory computer readable storage medium comprising code stored thereon for providing views of an object model, the non-transitory computer readable storage medium comprising code stored thereon that when executed, performs a method comprising:
receiving a template specifying allowable access for a first object using qualifiers for the first object, said qualifiers including a first list of one or more roles and a second list including a plurality of levels of expertise, wherein each of the plurality of levels of expertise denote a different level of expertise for each of the one or more roles in the first list, each of the plurality of levels of expertise denoting a different level of skill and a different level of knowledge, a first of the plurality of levels of expertise denoting a higher level of knowledge and skill than a second of the plurality of levels of expertise;
determining, for a user identifier having an associated role and an associated level of expertise, whether to allow access to said first object, said determining including determining whether said associated role is included in said first list and whether said associated level of expertise is included in said second list; and
allowing access to said first object if said associated role is included in the first list and said associated level of expertise is included in the second list, wherein a first user identifier is associated with a first role of the first list and the first level of expertise and a second user identifier is associated with the first role and the second level of expertise, and wherein the first user identifier is allowed to perform at least one operation that said second user identifier is not allowed to perform whereby, to perform the at least one operation requires greater skill and knowledge than denoted by the second level of expertise, and
wherein the template identifies a first method for the first object, said first method including a first parameter with one or more first parameter-level qualifiers applying only to the first parameter and indicating that a user identifier associated with the first role and first level of expertise is allowed to specify a value for the first parameter and a user identifier associated with the first role and the second level of expertise is not allowed to specify a value for the first parameter thereby allowing the first user identifier to specify a value for the first parameter and not allowing the second user to specify a value for the first parameter.

\* \* \* \* \*